(12) United States Patent
Shinomiya

(10) Patent No.: US 7,589,787 B2
(45) Date of Patent: Sep. 15, 2009

(54) SOLID STATE IMAGE SENSING DEVICE

(75) Inventor: Kohji Shinomiya, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 714 days.

(21) Appl. No.: 10/882,221

(22) Filed: Jul. 2, 2004

(65) Prior Publication Data

US 2005/0001905 A1  Jan. 6, 2005

(30) Foreign Application Priority Data

Jul. 2, 2003 (JP) .............................. 2003-190498

(51) Int. Cl.
   H04N 5/225  (2006.01)
   H01L 23/02  (2006.01)
   G03B 17/00  (2006.01)
(52) U.S. Cl. .................. 348/374; 348/372; 348/373; 257/678; 396/542
(58) Field of Classification Search ................ 348/372, 348/340, 373, 374, 375, 376, 187, 76; 257/432, 257/434, 678; 396/542
See application file for complete search history.

(56) References Cited

U.S. PATENT DOCUMENTS

| | | |
|---|---|---|
| 5,387,810 A | 2/1995 | Seta |
| 5,434,436 A | 7/1995 | Taniguchi |
| 5,523,622 A | 6/1996 | Harada |
| 5,801,407 A | 9/1998 | Yamada |
| 6,121,644 A | 9/2000 | Tsujihashi |
| 6,198,362 B1 | 3/2001 | Harada |
| 6,522,173 B1 | 2/2003 | Otsuka |
| 6,570,206 B1 | 5/2003 | Otsuka |
| 6,768,516 B2 * | 7/2004 | Yamada et al. ............. 348/340 |
| 6,936,914 B2 | 8/2005 | Shinomiya |
| 7,046,296 B2 * | 5/2006 | Shinomiya ................. 348/374 |
| 7,166,907 B2 * | 1/2007 | Onishi et al. ............... 257/680 |
| 7,180,546 B2 * | 2/2007 | Kobayashi, Kazuya ..... 348/374 |
| 2001/0055073 A1 | 12/2001 | Shinomiya |
| 2002/0008597 A1 | 1/2002 | Otsuka |
| 2004/0041938 A1 * | 3/2004 | Seo et al. .................... 348/340 |
| 2004/0095501 A1 * | 5/2004 | Aizawa et al. ............. 348/340 |

FOREIGN PATENT DOCUMENTS

CN  1489206 A  4/2004

(Continued)

OTHER PUBLICATIONS

Nishitani, Nobuyuki, "EMC design for Video Camera." The Journal of Japan Institute for Interconnecting and Packaging Electronic Circuits, vol. 10, No. 4, Jul. 20, 1995, pp. 227-230.

(Continued)

Primary Examiner—David L Ometz
Assistant Examiner—Peter Chon
(74) Attorney, Agent, or Firm—McDermott Will & Emery LLP

(57) ABSTRACT

Each of a pair of power supply electric lines (11 and 12) connected to power supply pads of a solid state image sensor (1) and a pair of power supply electric lines (13 and 14) connected to power supply pads of an integrated circuit chip (2) is arranged so that the power supply electric lines included in each power supply electric line pair are in parallel with each other and has a very small gap between them. The power supply electric lines (11 to 14) have a certain width and bend portions that are curved smoothly with a predetermined curvature or less and are formed on a flexible wiring board (3). In each of the solid state image sensor (1) and the integrated circuit chip (2), the high-potential and low-potential power supply pads are arranged side by side.

13 Claims, 7 Drawing Sheets

FOREIGN PATENT DOCUMENTS

| | | |
|---|---|---|
| JP | 6-216272 | 8/1994 |
| JP | 07-193189 | 7/1995 |
| JP | 08-288626 | 11/1998 |
| JP | 11-261181 | 9/1999 |
| JP | 11-284126 | 10/1999 |
| JP | 2000-20573 | 1/2000 |
| JP | 2002-26272 | 1/2002 |
| JP | 2004-128409 A | 4/2004 |

OTHER PUBLICATIONS

Iizuka, Taiji, "EMC Design for Personal Information Intelligent Tool." The Journal of Japan Institute for Interconnecting and Packaging Electronic Circuits, vol. 10, No. 4, Jul. 1995, pp. 214-216.

Otsuka, Kanji. "Supporting Role of MCM in High Density Packaging." The Journal of Japan Institute for Interconnecting and Packaging Electronic Circuits, vol. 11, No. 5, Aug. 20, 1996, pp. 301-305.

Chinese Office Action with English Translation issued in corresponding Chinese Patent Application No. 200410062873.1, Mailed on Apr. 20, 2007.

Japanese Office Action, with English Translation, issued in Japanese Patent Application No. JP 2003-190498, dated Mar. 24, 2009.

Paul, Clayton R.; "Introduction to Electromagnetic Compatibility", Wiley Series in Microwave and Optical Engineering, pp. 4, (1992).

* cited by examiner

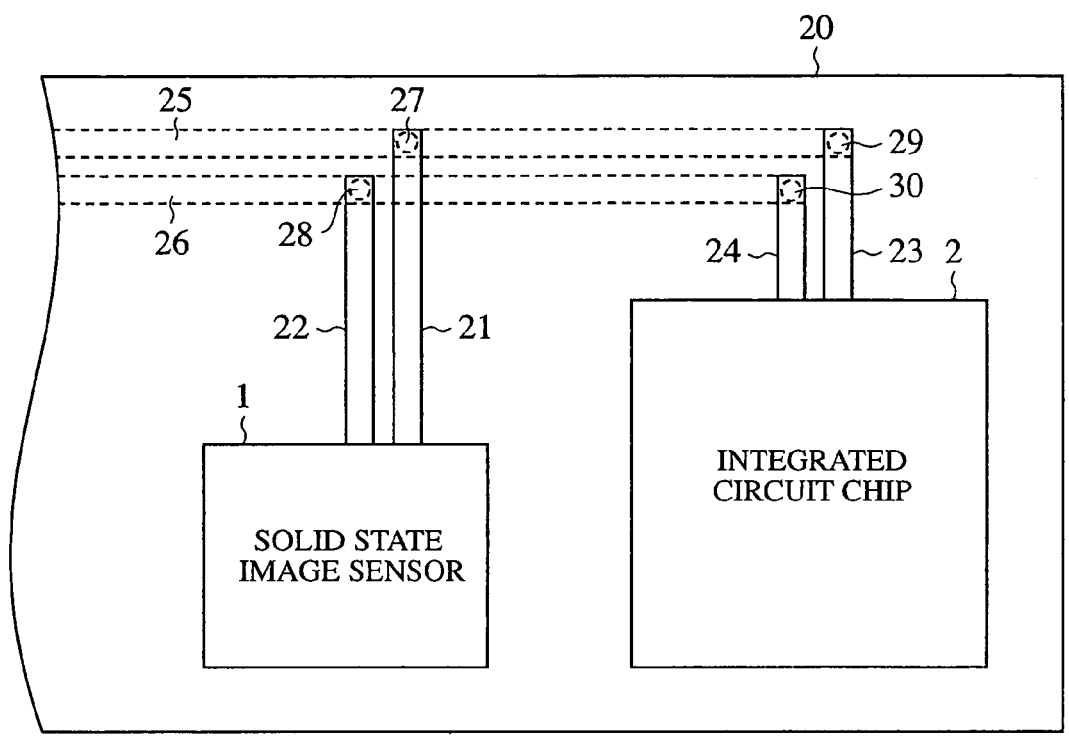
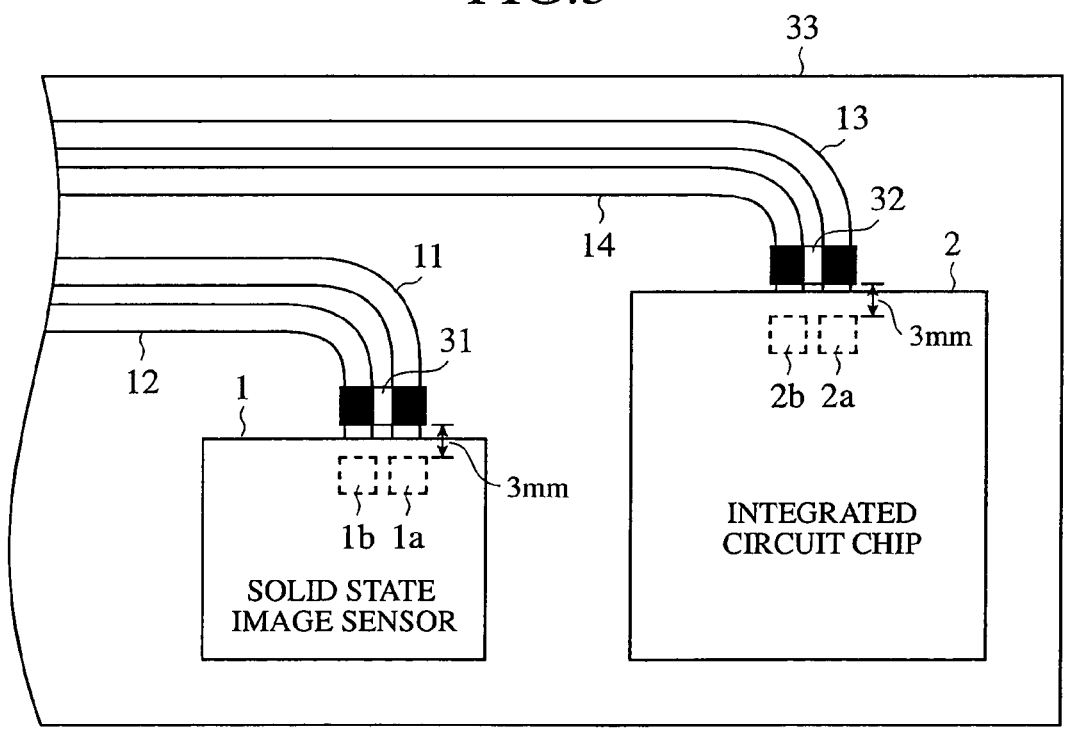

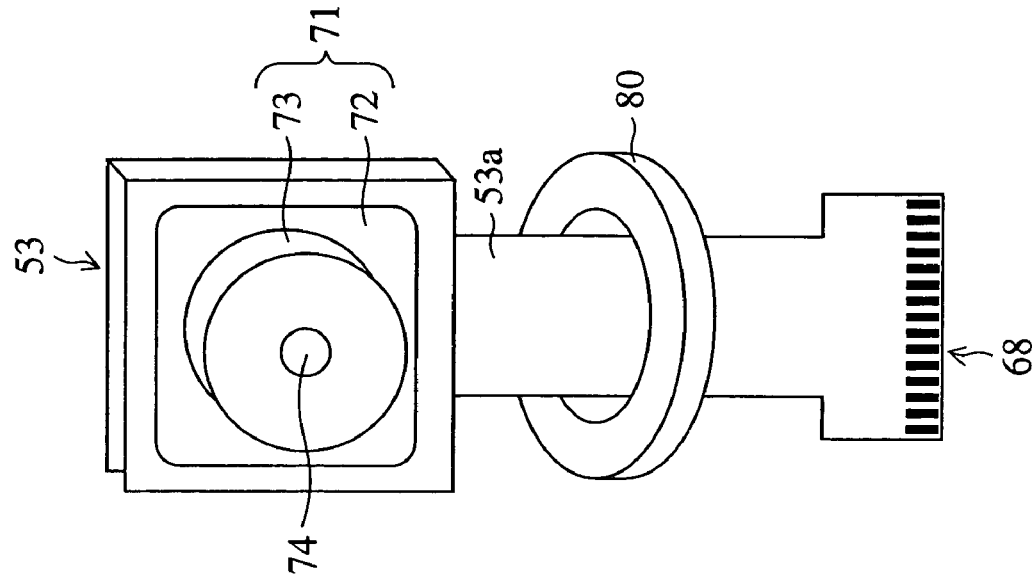
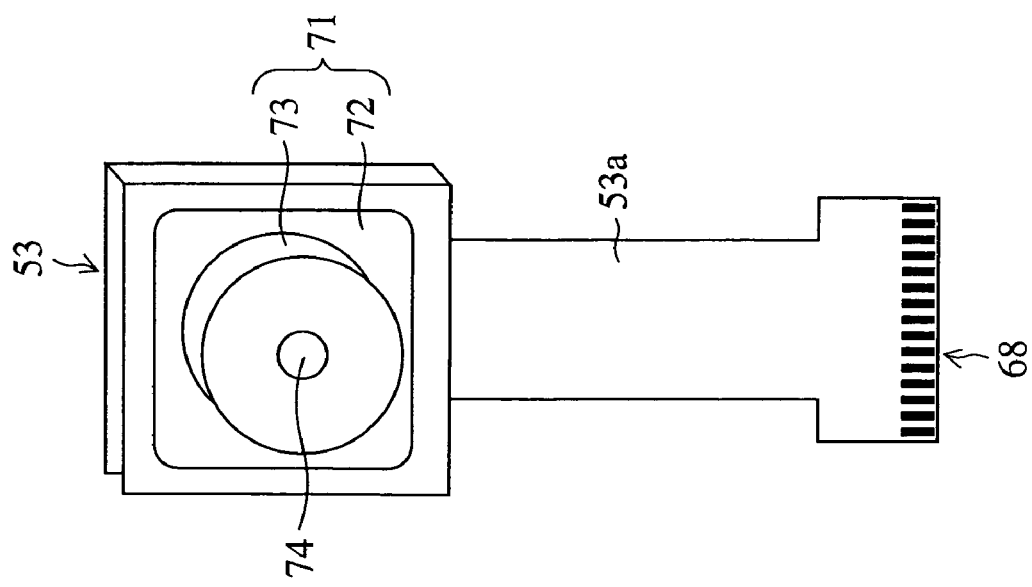

SOLID STATE IMAGE SENSING DEVICE

BACKGROUND OF THE INVENTION

1. Field of the Invention

The present invention relates to a solid state image sensing device in which Electromagnetic compatibility (referred to as EMC from here on) measures, i.e., Electromagnetic interference (referred to as EMI from here on) and Electromagnetic susceptibility (referred to as EMS from here on) measures are taken.

2. Description of Related Art

Most of solid state image sensing devices are constructed as a so-called multi-chip module in which a solid state image sensor and two or more integrated circuit chips are disposed on a printed wiring board, and are used for camcorder recording apparatus, digital cameras, camera-equipped personal digital assistants, camera-equipped mobile phones, and so on. Therefore, a downsizing of solid state image sensing devices has been required.

For example, a camera-equipped mobile phone has a housing having a very small mounting area and a very small mounting volume, in which processing circuits for processing an image signal, a voice signal, a data signal, etc., a control circuit for controlling these circuits, a communication circuit for converting the processed signals into electric waves and for transmitting them and receiving electric waves, a liquid-crystal-display circuit, and so on are mounted, and these circuits need to operate simultaneously. Electric waves emitted out of such a camera-equipped mobile phone may cause electromagnetic induction in each of the circuits mounted in the mobile phone, and this electromagnetic induction may cause the camera-equipped mobile phone to malfunction.

As a result of the malfunction, there cause signs of trouble, such as a striped pattern which appears in a picked-up image, distortion of the picked-up image, improper color reproduction of the picked-up image, and reduction in the signal-to-noise ratio of the picked-up image. In addition, there is a possibility that a passing through current noise peculiar to CMOS circuits, which has occurred in a digital circuit of the camera-equipped mobile phone flows into an image pickup processing circuit by way of power supply electric lines, and can reduce the signal-to-noise ratio of the picked-up image. Unnecessary radiation of electromagnetic waves may occur from the solid state image sensing device mounted in the mobile phone, and may induce other circuits mounted in the mobile phone and produce noises. As a result, such unnecessary radiation of electromagnetic waves from the solid state image sensing device may cause the other circuits mounted in the mobile phone to malfunction.

Therefore, EMC measures have to be taken in a prior art solid state image sensing device on which an integrated-circuit-chip module is mounted. For example, the integrated-circuit-chip module is implemented on a printed wiring board or package that is so designed that EMC measures are installed.

Concretely, the following techniques are used as the above-mentioned EMC measures. A method of shielding noise sources or parts which are easy to be influenced by noises, i.e., a method of shielding against electric fields, and a method of reducing the impedance of power supply electric lines so as to reduce changes in a voltage drop due to a current change, and, in order to prevent a signal that occurs in a circuit from entering other circuits via a power supply circuit, widening both a power supply electric line having a power supply potential and another power supply electric line having a ground potential (referred to as a pair of power supply electric lines from here on) which are formed on the printed wiring board, and arranging them in the form of a plane-shaped pattern. In addition, there has been provided another method (see patent reference 1) of forming a multilayer printed wiring board, forming clock signal electric lines in both layers which are located above and under a power supply layer or a ground layer, respectively, and forming grounded guard patterns on both sides of and in the vicinity of each of the clock signal electric lines.

In an integrated circuit chip mounted in such a printed wiring board or a packaged board in which EMC measures are taken, one electric line having a power supply potential and another electric line having a ground potential are not adjacent to each other in a plane, but are so arranged that they overlap in three dimensions, and an electrode pad for connecting with the electric line having a power supply potential and another electrode pad for connecting with the electric line having a ground potential are not arranged side by side along one side of the LSI chip (see patent reference 2). In a prior art packaged board, a power supply potential is supplied from an external lead, by way of a through hole, to a power supply conductor which is sandwiched by grounded conductors, and this power supply conductor is connected to a semiconductor chip by way of a through hole while the grounded conductors are connected to each other by way of a through hole (see patent reference 3).

Conventionally, in most cases, after a design stage in which a solid state image sensing device is contained in either a module or a package has been completed, examination of EMC measures is actually performed in a stage of mounting a printed wiring board on which the module or package containing the solid state image sensing device is disposed. Then, a measure of reducing the resistance of power supply electric lines as small as possible so as to reduce changes in the power supply voltage due to changes in the consumed electric current flowing through the solid state image sensing device, which occur while the solid state image sensing device operates, a measure of shielding a part of the circuit that needs to be running delicately from electromagnetic fields so as to shield electromagnetic induction from outside the solid state image sensing device, and a measure of shielding a part of the circuit that handles a high-frequency signal against electromagnetic fields so as to prevent electromagnetic waves from leaking to outside the solid state image sensing device are taken.

To be more specific, a measure of widening the power supply electric lines and a measure of enclosing a part of the circuitry of the solid state image sensing device with a metal plate are taken. As an alternative, a measure of forming inter-layer electric lines in the form of a plane-shaped pattern in the multilayer printed wiring board, as well as a measure of widening the power supply electric lines and a measure of enclosing a part of the circuitry with a metal plate, are taken.

[Patent reference 1] Japanese patent application publication No. 2000-20573 (pp. 3 to 4 and FIGS. 3 and 5)

[Patent reference 2] Japanese patent application publication No. 2002-26272 (pp. 7 and FIG. 11)

[Patent reference 3] Japanese patent application publication No. 6-216272 (pp. 3 to 4 and FIG. 1)

As can be seen from the above description, a problem with a prior art solid state image sensing device constructed as above is that while EMC measures are not adequately taken in design stages and EMC measures are hardly installed in design stages for either a module or package in which a solid state image sensor is mounted, the widening of the power supply electric lines, which is carried out as EMC measures, causes an increase in the size of the solid state image sensor and the size of a printed wiring board on which the solid state image sensor is mounted, the enclosing of the solid state image sensor and other components with a shielding member, such as a metal plate, causes an increase in the sizes of those components, as well as an increase in the weights of the components. As a result, the EMC measures which are thus taken run counter to requests for reduction in the size and weight of the prior art solid state image sensing device provided with the solid state image sensor and so on. Another problem is that since additional material costs and additional manufacturing processes are needed for the EMC measures, the manufacturing cost is increased.

SUMMARY OF THE INVENTION

The present invention is made in order to solve the above-mentioned problems, and it is therefore an object of the present invention to provide a solid state image sensing device which offers strengthened resistance to EMC noises and provides improved stability of operation with a simple structure.

In accordance with the present invention, there is provided a solid state image sensing device including a wiring board including a first high-potential line and a first low-potential line which are adjacent to each other in a plane and are arranged in parallel with each other, and a solid state image sensor including first and second power supply pads which are connected to the first high-potential line and the first low-potential line, respectively, the solid state image sensor running from a power supply voltage applied thereto via the first high-potential line and the first low-potential line. The solid state image sensing device can further include an integrated circuit chip that runs from a supply voltage supplied thereto via a second high-potential line and a second low-potential line, for processing a signal from the solid state image sensor.

Therefore, the solid state image sensing device according to the present invention can supply a stable power supply voltage and a stable power supply current to each of the solid state image sensor and the integrated circuit chip, and can make the image pickup function thereof work with stability.

Further objects and advantages of the present invention will be apparent from the following description of the preferred embodiments of the invention as illustrated in the accompanying drawings.

BRIEF DESCRIPTION OF THE DRAWINGS

FIG. 2 is an explanatory drawing showing the structure of a solid state image sensing device in accordance with embodiment 2 of the present invention;

FIG. 3 is an explanatory drawing showing the structure of a solid state image sensing device in accordance with embodiment 3 of the present invention;

FIG. 10 is an outline view of the solid state image sensing device according to embodiment 6;

FIG. 11 is an outline view showing the structure of a solid state image sensing device according to a variant of embodiment 6;

DETAILED DESCRIPTION OF THE PREFERRED EMBODIMENTS

The preferred embodiments of the present invention will be now described with reference to the accompanying drawings.

Embodiment 1

Figure 1:
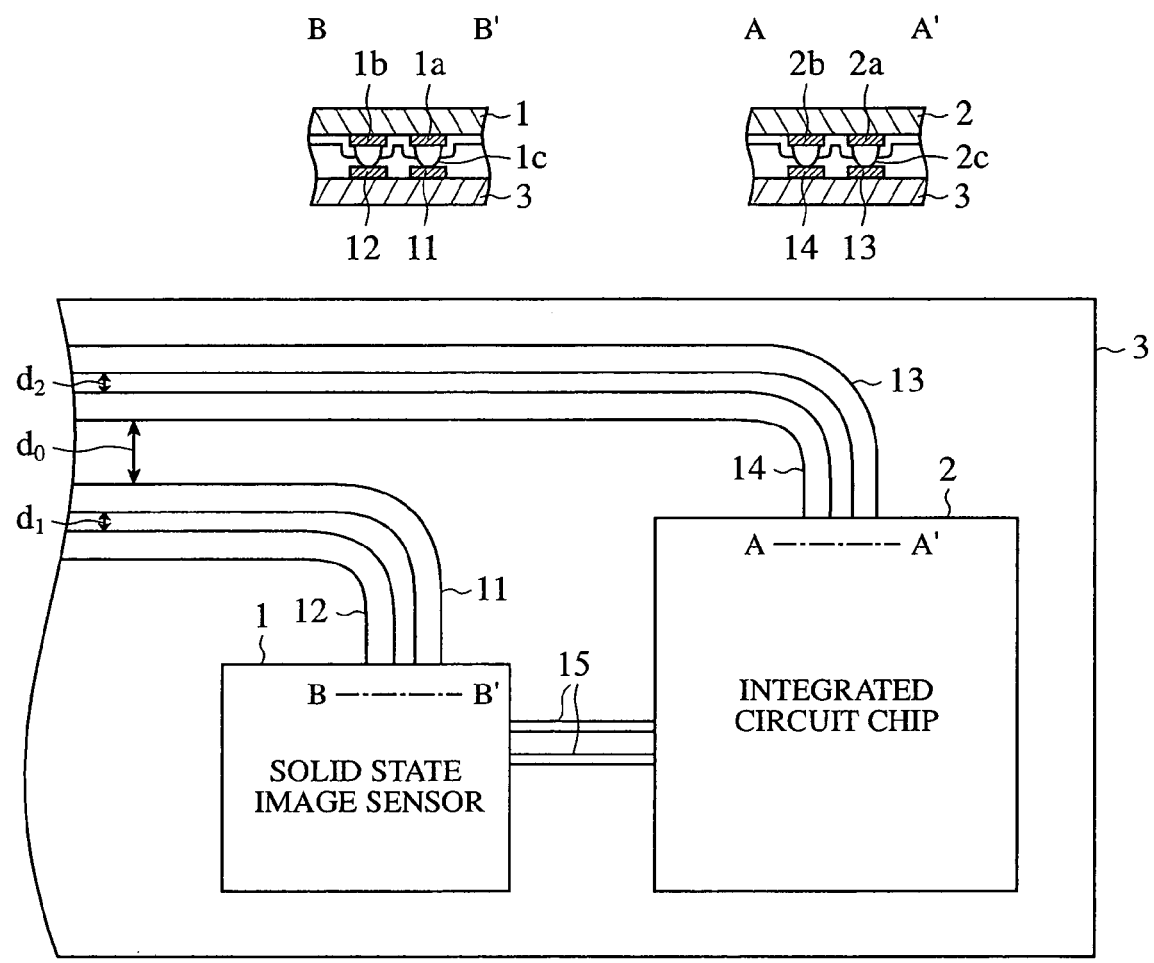
FIG. 1 is an explanatory drawing showing the structure of a solid state image sensing device in accordance with embodiment 1 of the present invention.

FIG. 1 is an explanatory drawing showing the structure of a solid state image sensing device according to embodiment 1 of the present invention. A part of a flexible wiring board on which a solid state image sensor and an integrated circuit chip are mounted is illustrated in FIG. 1, and an illustration of signal electric lines other than power supply electric lines, except for a part of the signal electric lines, is omitted.

The solid state image sensor 1 and the integrated circuit chip 2 as shown in FIG. 1 are flip-chip bonded on a side surface of the flexible wiring board 3 on which printed wiring is formed. High-potential and low-potential power supply electric lines are formed on the side surface of the flexible wiring board 3. Each high-potential power supply electric line can supply a power supply potential of 2.8V to either the solid state image sensor 1 or the integrated circuit chip 2, and each low-potential power supply electric line can supply a ground potential (i.e., 0V) to either the solid state image sensor 1 or the integrated circuit chip 2. However, the potentials supplied by those high-potential and low-potential power supply electric lines are not limited to those values. In accordance with this embodiment 1, the low-potential power supply electric lines 11 and 14 and the high-potential power supply electric lines 12 and 13 are formed on the side surface of the flexible wiring board 3, as shown in FIG. 1. The low-potential power supply electric line 11 and the high-potential power supply electric line 12 can change their places. Similarly, the high-potential power supply electric line 13 and the low-potential power supply electric line 14 can change their places. These power supply electric lines 11, 12, 13, and 14 are thus formed in the single plane. The low-potential power supply electric line 11 and the high-potential power supply electric line 12 are so arranged as to be adjacent to each other in the single plane and be in parallel with each other, and similarly, the high-potential power supply electric line 13 and the low-potential power supply electric line 14 are so arranged as to be adjacent to each other in the single plane and be in parallel with each other. No other electric lines are arranged between the low-potential power supply electric line and the high-potential power supply electric line included in each power supply electric line pair. The solid state image sensor 1 has a power supply pad 1a for connecting with the low-potential power supply electric line 11 and another power supply pad 1b for connecting with the high-potential power supply electric line 12 which are formed along one side thereof, as illustrated in a cross-sectional view, taken along the broken line B-B' of FIG. 1, partially showing a longitudinal cross section of the solid state image sensor 1. The power supply pad 1a and the other power supply pad 1b are connected to the power supply electric line 11 and the power supply electric line 12 by way of gold bumps 1c, respectively. The integrated circuit chip 2 has a power supply pad 2a for connecting with the high-potential power supply electric line 13 and another power supply pad 2b for connecting with the low-potential power supply electric line 14 which are formed along one side thereof, as illustrated in a cross-sectional view, taken along the broken line A-A' of FIG. 1, partially showing a longitudinal cross section of the integrated circuit chip 2. The power supply pad 2a and the other power supply pad 2b are connected to the power supply electric line 13 and the power supply electric line 14 by way of gold bumps 2c, respectively. The solid state image sensor 1 runs from a supply voltage supplied thereto via the low-potential power supply electric line 11 and the high-potential power supply electric line 12, converts pixel information into a digital signal, and sends out it onto two or more signal electric lines 15. The integrated circuit chip 2 runs from a supply voltage supplied thereto via the high-potential power supply electric line 13 and the low-potential power supply electric line 14, and processes the digital signal which is sent thereto from the solid state image sensor 1 by way of the two or more signal electric lines 15, for example.

Since the solid state image sensor 1 is formed on the wiring board of the solid state image sensing device, it is preferable that in order to prevent dust and so on from being adhered to a light receiving unit, i.e., an image pixel area of the solid state image sensor 1, the wiring board is formed of a material that can prevent dust from being produced from a cut face when the wiring board is machined and from being produced due to deterioration over time. Such a material that can prevent dust from being produced after the wiring board is formed can be polyiamid, polyester, or the like. In general, such a material is used to form a flexible substrate. It is also preferable to use a flexible substrate as the flexible wiring board 3 in order to miniaturize the solid state image sensing device.

As mentioned above, the two pairs of high-potential and low-potential power supply electric lines for supplying electric power to the solid state image sensor 1 and the integrated circuit chip 2 are disposed on the side surface of the flexible wiring board 3, the low-potential power supply electric line 11 and the high-potential power supply electric line 12 are connected to the low-potential and high-potential power supply pads 1a and 1b of the solid state image sensor 1, respectively, and the high-potential power supply electric line 13 and the low-potential power supply electric line 14 are connected to the high-potential and low-potential power supply pads 2a and 2b of the integrated circuit chip 2, respectively. In each of the set of the low-potential power supply electric line 11 and the high-potential power supply electric line 12 for supplying a voltage to the solid state image sensor 1 and the other set of the high-potential power supply electric line 13 and the low-potential power supply electric line 14 for supplying a voltage to the integrated circuit chip 2, the high-potential and low-potential power supply electric lines have a width and a gap between them which are held almost constant throughout the length of the lines. Each of the set of the power supply electric line 11 and the power supply electric line 12 and the other set of the power supply electric line 13 and the power supply electric line 14 is so arranged that the two power supply electric lines are in parallel with each other and are extending from the solid state image sensor 1 or the integrated circuit chip 2 toward an outer edge of the flexible wiring board 3. Hereafter, one high-potential power supply electric line and one low-potential power supply electric line are referred to as one pair of power supply electric lines (i.e., a power supply electric line pair). That is, the power supply electric line 11 and the power supply electric line 12 that pair up with each other are referred to as the first power supply electric line pair 11 and 12 (or the first pair of power supply electric lines 11 and 12), and the power supply electric line 13 and the power supply electric line 14 that pair up with each other are referred to as the second power supply electric line pair 13 and 14 (or the second pair of power supply electric lines 13 and 14). Each of the first power supply electric line pair 11 and 12 and the second power supply electric line pair 13 and 14 is so arranged that the power supply electric lines included in each power supply electric line pair are parallel to each other, and is bent smoothly when reaching in the vicinity of the outer edge of the flexible wiring board 3 in such a manner that the power supply electric lines included in each power supply electric line pair have a predetermined radius of curvature or less and are curved as gently as possible in a limited electric wiring space. The power supply electric lines included in each power supply electric line pair are arranged along the outer edge of the flexible wiring board 3. Signal electric lines (in FIG. 1, only the signal electric lines 15 are illustrated) other than the power supply electric lines 11 to 14 are also formed on the side surface of the flexible wiring board 3 on which the printed wiring is formed, as mentioned above. These signal electric lines are so arranged as to have shorter lengths in order to make it possible to make efficient use of the electric wiring space and to prevent the solid state image pickup device from malfunctioning.

The gap d0 between the first pair of power supply electric lines 11 and 12 and the second pair of power supply electric lines 13 and 14 is two or more times as long as the gap d1 between the power supply electric line 11 and the power supply electric line 12 which constitute the first power supply electric line pair 11 and 12, and is also two or more times as long as the gap d2 between the power supply electric line 13 and the power supply electric line 14 which constitute the second power supply electric line pair 13 and 14. Each of the power supply electric lines 11 to 14 has a larger width than the signal electric lines 15.

Next, the operation of the solid state image sensing device in accordance with embodiment 1 of the present invention will be explained. Each of the first and second pairs of power supply electric lines extending from the corresponding pair of power supply pads which are arranged side by side as mentioned above is arranged along the outer edge of the flexible wiring board 3 so that the power supply electric lines are substantially in parallel with each other and have a nearly constant width and a nearly constant gap between them throughout the length thereof. Each of the first and second pairs of power supply electric lines thus arranged can be assumed to be a distributed constant circuit, and can have an intrinsic impedance which is held at a low value throughout the length thereof.

Therefore, a differential signal (i.e., a set of a power supply current and a power supply voltage which flow in opposite directions through each pair of power supply electric lines and which are supplied to either the solid state image sensor 1 or the integrated circuit chip 2), and in-phase signals (i.e., a current and a voltage which are produced in each pair of power supply electric lines due to induction by electromagnetic waves from outside the solid state image sensing device) are made to transmit independently of each other through each pair of power supply electric lines. Therefore, the pair of power supply voltage and power supply current can be efficiently transmitted, as differential electric power components, to each of the solid state image sensor 1 and the integrated circuit chip 2 which is a load.

In accordance with a general technology of manufacturing printed wiring boards, when printed wiring boards are manufactured with their line and space being set to a width of 0.1 mm, their characteristics and economical efficiency can be improved. On the other hand, it is difficult to form any pair of power supply electric lines having the same gap between them throughout the length thereof and the same intrinsic impedance at every point of the length thereof. In accordance with this embodiment, the first pair of power supply electric lines 11 and 12 can be so formed that the gap between the power supply electric line 11 and the power supply electric line 12 is 0.1 mm or less and is held almost constant throughout the length of these power supply electric lines. When the first pair of power supply electric lines 11 and 12 is thus formed, the intrinsic impedance of the first pair of power supply electric lines can be set to 50 ohms or less and can have a low value which is sufficiently effective as EMC measures. Although it is desirable to reduce the gap between the two power supply electric lines included in each power supply electric line pair as small as possible in consideration of technological limitations, the intrinsic impedance of the two power supply electric lines can be sufficiently reduced even when the gap is set to about 0.1 mm in view of cost/performance tradeoffs. Strictly speaking, by taking the machining accuracy into consideration, it is difficult to make the gap between the two power supply electric lines constant at any point thereof. The above-mentioned constantly-held gap (or the gap of 0.1 mm or less) means that while errors can be reduced as much as possible, the gap is held almost constant throughout the length of the power supply electric lines (or the gap is held at 0.1 mm or less throughout the length of those power supply electric lines).

When the first pair of power supply electric lines 11 and 12 and the second pair of power supply electric lines 13 and 14 are so formed as mentioned above, while an electromagnetically induced voltage which is produces by transmitted electric waves outputted from small communication equipment, such as a mobile phone, or high-frequency signals which occurs when a digital circuit operates is uniformly applied, as in-phase components, to the two power supply electric lines included in each power supply electric line pair, no electromagnetically induced current flows through the two power supply electric lines included in each power supply electric line pair because it is prevented by high-impedance nodes which appear at intervals of one-quarter wavelength with respect to electromagnetic waves from outside the solid state image sensing device. In other words, the first pair of power supply electric lines 11 and 12 and the second pair of power supply electric lines 13 and 14 can eliminate electromagnetic inductions by the solid state image sensor 1 and the integrated circuit chip 2. Thus, in accordance with the present invention, effective EMC measures are taken for equipment that deals with signals of frequencies of several GHz, such as a solid state image sensing device according to this embodiment or any other embodiment mentioned later. When such equipment that deals with signals of frequencies of several GHz is equipped with a plane-shaped pattern and a static-shielding member on a wiring board thereof, a bad influence may be exerted upon the equipment. For example, a plane-shaped pattern operates like an intermediate electrode of a capacitor, a noise that occurs in one of two electric lines between which the plane-shaped pattern is sandwiched to the other electric line through the plane-shaped pattern, and it is therefore impossible to eliminate noises from the wiring board. Thus, it is effective to equip the wiring board with a pair of power supply electric lines as mentioned above for each of the solid state image sensor 1 and the integrated circuit chip 2.

As mentioned above, in accordance with embodiment 1, the signal electric lines 15 for connecting between the solid state image sensor 1 and the integrated circuit chips 2 which are mounted on the flexible wiring board 3 is arranged on a printed wiring surface of the flexible wiring board 3 on which the power supply electric lines 11 to 14 are formed so that the signal electric lines have shorter lengths, thereby making it possible to make efficient use of the electric wiring space and to prevent the solid state image pickup device from malfunctioning. Therefore, since electromagnetic waves emitted from a wiring pattern including those signal lines can be reduced and therefore the adverse effect of the electromagnetic waves upon other wiring patterns can be reduced, the present embodiment offers an advantage of being able to reduce the adverse effect of electromagnetic waves upon the solid state image sensing device and to make the image pickup function of the solid state image sensing device work with stability.

In addition, since the first pair of power supply electric lines 11 and 12 and the second pair of power supply electric lines 13 and 14 are so arranged that the gap between the first pair of power supply electric lines 11 and 12 and the second pair of power supply electric lines 13 and 14 is two or more times as long as the gap between the power supply electric line 11 and the power supply electric line 12 which constitute the first power supply electric line pair 11 and 12, the intrinsic impedance of the first pair of power supply electric lines 11 and 12 can be sufficiently reduced and the coupling between the first power supply electric line pair 11 and 12 and the second power supply electric line pair 13 and 14 with respect to electric fields, magnetic fields, and electrostatic inductions can be sufficiently reduced. Therefore, the first pair of power supply electric lines 11 and 12 can be handled electrically independently, and the second pair of power supply electric lines ca be handled similarly. The present embodiment thus offers another advantage of easily providing layout design of the power supply electric lines 11 to 14.

Since the first pair of power supply electric lines 11 and 12 has a wider width than those of other signal lines, the resistances of the power supply electric line 11 and the power supply electric line 12 can be reduced and therefore the operating frequency characteristics of the distributed constant circuit constructed of the first pair of power supply electric lines 11 and 12 can be improved. The present embodiment thus offers a further advantage of taking EMC measures for signals of higher frequencies.

In addition, since each of the first pair of power supply electric lines 11 and 12 and the second pair of power supply electric lines 13 and 14 has a bend portion that is so bent smoothly that the power supply electric lines included in each power supply electric line pair have a predetermined radius of curvature or less and are curved gently, the change in the impedance of each of the first and second pairs of power supply electric lines which occurs at the bend portion thereof can be reduced. The present embodiment thus offers another advantage of being able to reduce reflection of signals and radiation of electromagnetic waves which occur at the bend portion and hence dynamic noises, thereby improving the resistance to noise.

Embodiment 2

FIG. 2 is an explanatory drawing showing the structure of a solid state image sensing device in accordance with embodiment 2 of the present invention. The same components as those of the solid state image sensing device of embodiment 1 as shown in FIG. 1, and like components are designated by the same reference numerals as shown in FIG. 1, and therefore the explanation of those components will be omitted hereafter. In FIG. 1, a part of a wiring board on which one solid state image sensor and one integrated circuit chip are mounted is illustrated, and an illustration of signal lines other than power supply electric lines is omitted.

The solid state image sensor 1 and the integrated circuit chip 2 as shown in FIG. 2 are flip-chip mounted on the flexible wiring board 20 having front and back surfaces on each of which printed wiring is formed. Each of the solid state image sensor 1 and the integrated circuit chip 2 has a power supply pad for connecting with a high-potential power supply electric line and another power supply pad for connecting with a low-potential power supply electric line, like that of above-mentioned embodiment 1, the power supply pads being arranged side by side at predetermined locations, which are not illustrated, of the solid state image sensor 1 or the integrated circuit chip 2.

On the front surface of the double-sided flexible printed wiring board 20, the two power supply pads of the solid state image sensor 1 flip-chip mounted on the flexible wiring board 20 are connected to a power supply electric line 21 and another power supply electric line 22, respectively, and the two power supply pads of the integrated circuit chip 2 are connected with a power supply electric line 23 and another power supply electric line 24, respectively. The power supply electric lines 21 and 22 are extending from the two corresponding power supply pads respectively connected thereto toward an outer edge of the flexible wiring board 20 so that their width and the gap between them are held almost constant throughout their length and they are parallel to each other. Similarly, the power supply electric lines 23 and 24 are extending from the two corresponding power supply pads respectively connected thereto toward the outer edge of the flexible wiring board 20 so that their width and the gap between them are held almost constant throughout their length and they are parallel to each other.

On the back surface of the flexible wiring board 20 on which electric wiring is formed, a power supply electric line 25 and another power supply electric line 26 are arranged along the outer edge of the flexible wiring board 20 so that they are nearly parallel to each other and their width and the gap between them are held almost constant throughout their length. A via hole 27 is disposed at a location where the power supply electric line 25 formed on the back surface of the flexible wiring board 20 and the power supply electric line 21 formed on the front surface of the flexible wiring board 20 intersect, a via hole 29 is similarly disposed at a location where the power supply electric line 25 and the power supply electric line 23 intersect, a via hole 28 is further disposed at a location where the power supply electric line 26 and the power supply electric line 22 intersect, and a via hole 30 is disposed at a location where the power supply electric line 26 and the power supply electric line 24 intersect. Each of the via holes 27 to 30 has a diameter which is much the same as or smaller than the widths of the power supply electric lines 21 to 26.

The power supply electric line 21 connected to the solid state image sensor 1 is connected, via the via hole 27, to the power supply electric line 25 formed on the back surface of the flexible wiring board 20. The power supply electric line 23 connected to the integrated circuit chip 2 is also connected, via the via hole 29, to the power supply electric line 25. The power supply electric line 22 connected to the solid state image sensor 1 is connected, via the via hole 28, to the power supply electric line 26 formed on the back surface of the flexible wiring board 20. The power supply electric line 24 connected to the integrated circuit chip 2 is connected, via the via hole 30, to the power supply electric line 26.

Next, the operation of the solid state image sensing device in accordance with embodiment 2 of the present invention will be explained. As mentioned above, in each of the solid state image sensor 1 and the integrated circuit chip 2, the two high-potential and low-potential power supply pads are arranged side by side. The first pair of power supply electric lines 21 and 22, which are connected to the corresponding power supply pads, respectively, are so arranged that they are nearly parallel to each other and the width of those power supply electric lines and the gap between the power supply electric lines 21 and 22 are held almost constant throughout their length. The second pair of power supply electric lines 23 and 24, which are connected to the corresponding power supply pads, respectively, are so arranged that they are nearly parallel to each other, and the width of those power supply electric lines and the gap between the power supply electric lines 23 and 24 are held almost constant throughout their length.

The third pair of power supply electric lines 25 and 26 formed on the back surface of the flexible wiring board 20 is so arranged as to be extending along the outer edge of the flexible wiring board 20. Each of the first through third pairs of power supply electric lines thus arranged can be assumed to be a distributed constant circuit, and can have an intrinsic impedance which is held at a nearly-constant low value throughout the length thereof. The supply of electric power to each of the solid state image sensor 1 and the integrated circuit chip 2 can be performed in the form of a differential signal and in-phase signals that are transmitted independently of each other. Therefore, a power supply voltage and a power supply current can be efficiently transmitted, as differential electric power components, to each of the solid state image sensor 1 and the integrated circuit chip 2 which is a load.

As mentioned above, in accordance with embodiment 2, since the first pair of power supply electric lines 21 and 22 and the second pair of power supply electric lines 23 and 24 which are arranged on the front surface of the flexible wiring board 20 are connected to the third pair of power supply electric lines 25 and 26 formed on the back surface of the flexible wiring board 20 via the via holes 27 to 30, respectively, and the third pair of power supply electric lines 25 and 26 serves as a lead electric wiring portion of both the first and second pairs of power supply electric lines 11 to 14 of above-mentioned embodiment 1 which are extending from the flexible wiring board 20 toward external connection terminals which are not illustrated, the area of the flexible wiring board 20 can be reduced and the number of power supply electric lines included in the lead electric wiring portion can be reduced. Therefore, a downsizing of the solid state image sensing device can be achieved, the reliability of electric wiring connection of the solid state image sensing device can be increased, and the manufacturing cost can be reduced.

In addition, since each of the via holes 27 to 30 has a diameter which is much the same as or smaller than the widths of the power supply electric lines 21 to 26 formed on the flexible wiring board 20, the change in the impedance of electric wiring that occurs at each of the via holes 27 to 30 can be reduced. The present embodiment thus offers another advantage of being able to reduce reflection of signals and radiation of electromagnetic waves which occur at the junctions via the via holes 27 to 30 and hence dynamic noises, thereby improving the resistance to noise. The present embodiment also offers an advantage of making the image pickup function of the solid state image sensing device work with stability.

Embodiment 3

FIG. 3 is an explanatory drawing showing the structure of a solid state image sensing device according to embodiment 3 of the present invention. In the figure, the same components as those of the solid state image sensing device of embodiment 1 as shown in FIG. 1, and like components are designated by the same reference numerals as shown in FIG. 1, and therefore the explanation of those components will be omitted hereafter. In FIG. 3, a part of a wiring board on which one solid state image sensor and one integrated circuit chip are mounted is illustrated, and an illustration of signal lines other than power supply electric lines is omitted.

In accordance with this embodiment 3, the flexible wiring board 33 having a side surface on which printed wiring is formed, as shown in FIG. 3, corresponds to the flexible wiring board 3 shown in FIG. 1 on which capacitors 31 and 32 are disposed. In other words, the flexible wiring board 33 has the same structure as that explained in embodiment 1, with the exception that the flexible wiring board 33 has the capacitors 31 and 32 mounted thereon. Hereafter, the characterized portion of the solid state image sensing device according to embodiment 3 will be explained, and the explanation of the structure and operation of the same components as of the solid state image sensing device as shown in FIG. 1 will be omitted.

On the side surface of the flexible wiring board 33, the capacitor 31 is arranged at a very short distance from junctions of the power supply pads of the solid state image sensor 1 with a first pair of power supply electric lines 11 and 12. For example, the capacitor 31 is arranged and inserted at a distance of 3 mm or less from the power supply pads of the solid state image sensor 1 so as to connect between the power supply electric line 11 and the power supply electric line 12.

Similarly, on the side surface of the flexible wiring board 33, the capacitor 32 is arranged at a very short distance from junctions of the power supply pads of the integrated circuit chip 2 with a second pair of power supply electric lines 13 and 14. For example, the capacitor 32 is arranged and inserted at a distance of 3 mm or less from the power supply pads of the integrated circuit chip 2 so as to connect between the power supply electric line 13 and the power supply electric line 14. Thus, in order to insert a capacitor in the vicinity of the power supply pads of each of the solid state image sensor 1 and the integrated circuit chip 2, it is preferable to connect the power supply pads with the corresponding power supply electric lines by using bumps.

As previously mentioned, the capacitors 31 and 32 are arranged at a very short distance from the power supply pads of the solid state image sensor 1 and the integrated circuit chip 2, respectively, and are connected between the first and second pairs of power supply electric lines, respectively. Therefore, by adjusting the capacitances of these capacitors 31 and 32, the intrinsic impedance of each of the above-mentioned two pairs of power supply electric lines can be reduced with the solid state image sensing device 1 and the integrated circuit 2 being connected to the above-mentioned two pairs of power supply electric lines, respectively.

As mentioned above, in accordance with embodiment 3, the capacitor 31 is arranged at a very short distance from the junctions of the power supply pads of the solid state image sensor 1 with the first pair of power supply electric lines 11 and 12 and is connected between the power supply electric lines 11 and 12, and the capacitor 32 is arranged at a very short distance from the junctions of the power supply pads of the integrated circuit chip 2 with the second pair of power supply electric lines 13 and 14 and is connected between the power supply electric lines 13 and 14. Therefore, the intrinsic impedance of each of the two pairs of power supply electric lines can be reduced with the solid state image sensing device 1 and the integrated circuit 2 being connected to the two pairs of power supply electric lines, respectively. In addition, since the capacitor 31 is connected at a very short distance from the pair of power supply pads of the solid state image sensor 1 and the capacitor 32 is connected at a very short distance from the pair of power supply pads of the integrated circuit chip 2, it is possible to bypass and remove high-frequency noises which occur within the solid state image sensor 1 and the integrated circuit chip 2 and high-frequency noises which invade the solid state image sensor 1 and the integrated circuit chip 2 via the two pairs of power supply electric lines. The present embodiment therefore offers an advantage of being able to make the image pickup function of the solid state image sensing device work with stability.

Embodiment 4

Figure 4:
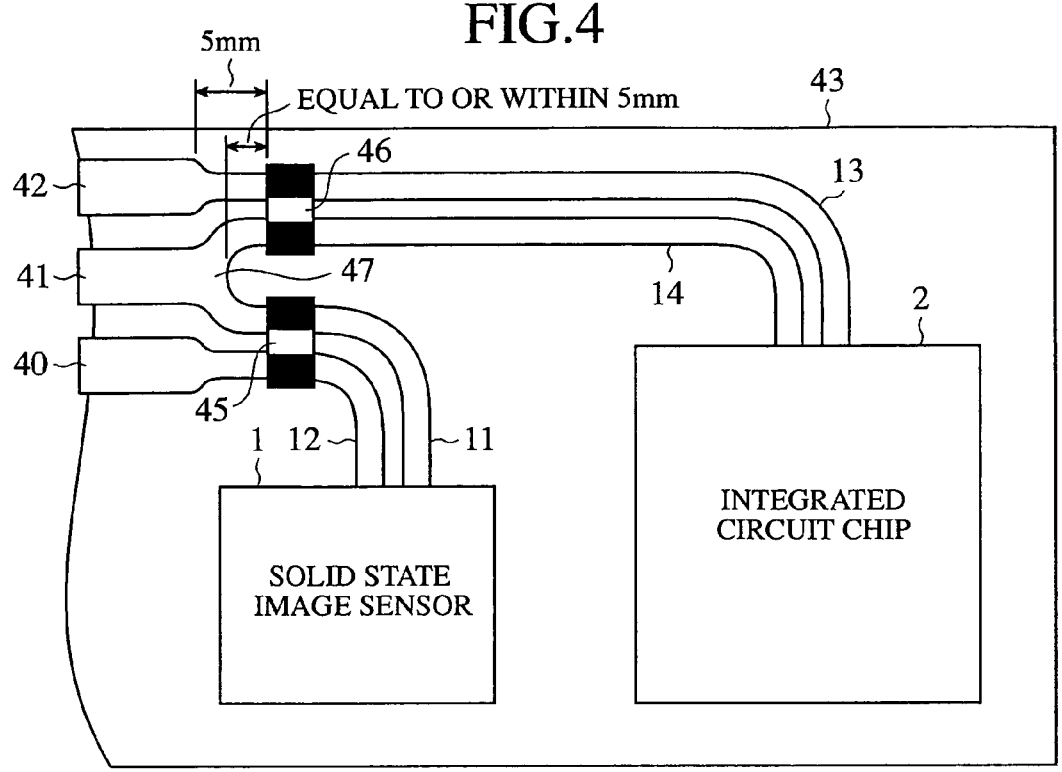
FIG. 4 is an explanatory drawing showing the structure of a solid state image sensing device in accordance with embodiment 4 of the present invention.

FIG. 4 is an explanatory drawing showing the structure of a solid state image sensing device according to embodiment 4 of the present invention. In the figure, the same components as those of the solid state image sensing device as shown in FIG. 1, and like components are designated by the same reference numerals as shown in FIG. 1, and therefore the explanation of those components will be omitted hereafter. In FIG. 4, a part of a wiring board on which one solid state image sensor and one integrated circuit chip are mounted is illustrated, and an illustration of external connection terminals connected to electric lines other than power supply electric lines and signal lines other than power supply electric lines is omitted.

A flexible wiring board 43 having a side surface on which printed wiring is formed, as shown in FIG. 4, is the one in which external connection terminals 40 to 42 and capacitors 45 and 46 are disposed on the side surface of the flexible wiring board 3 as shown in FIG. 1 on which printed wiring is formed. In other words, the flexible wiring board 43 of this embodiment has the same structure as the flexible wiring board 3 shown in FIG. 1, with the exception that the external connection terminals 40 to 42 and capacitors 45 and 46 are disposed on the side surface thereof. Hereafter, the characterized portion of the solid state image sensing device according to embodiment 4 will be explained, and the explanation of the structure and operation of the same components as of the solid state image sensing device as shown in FIG. 1 will be omitted.

The flexible wiring board 43 shown in FIG. 4 is so constructed that four power supply electric lines 11 to 14, which are arranged in parallel with one another and are extending along an outer edge of the flexible wiring board 43, like those as shown in FIG. 1, are connected to three external connection terminals 40 to 42. The four power supply electric lines 11 to 14 shown in FIG. 4 are extending along the outer edge of the flexible wiring board 43 while they are in parallel with one another, and the power supply electric line 12 located on an outer side of the four power supply electric lines 11 to 14 is connected to the external connection terminal 40, and the power supply electric line 13 located on another outer side of the four power supply electric lines 11 to 14 is connected to the external connection terminal 42. Furthermore, the remaining two 11 and 14 of the four power supply electric lines located on an inner side of the four power supply electric lines 11 to 14 are united to one line in the vicinity of the external connection terminal 41, and are then connected to the external connection terminal 41.

On the side surface of the flexible wiring board 43 on which printed wiring is formed, a capacitor 45 is inserted and connected between the power supply electric line 11 and the power supply electric line 12 at a very short distance from a united position 47 where the power supply electric line 11 and the power supply electric line 14 are united, e.g., at a distance of 5 mm or less from locations where the external connection connections 40 to 41 are connected to the power supply electric lines 11 to 14, respectively, along the power supply electric lines 11 to 14, and another capacitor 46 is inserted and connected between the power supply electric line 13 and the power supply electric line 14. In accordance with this embodiment, the low-potential power supply electric lines 11 and 14 for supplying a ground potential to the solid state image sensor 1 and the integrated circuit chip 2 are connected in common to the external connection terminal 41. As an alternative, the power supply electric line 11 and the power supply electric line 12 can change places and the power supply electric line 13 and the power supply electric line 14 can change places, and the high-potential power supply electric lines 12 and 13 can be connected in common to the external connection terminal 41.

Like the first pair of power supply electric lines 11 and 12 and the second pair of power supply electric lines 13 and 14 as shown in FIG. 1, each of the first pair of power supply electric lines 11 and 12 and the second pair of power supply electric lines 13 and 14 which are formed on the flexible wiring board 43 has a bend portion that is so bent smoothly that the power supply electric lines included in each power supply electric line pair have a predetermined radius of curvature or less and are curved gently. Each of a junction of the power supply electric line 12 which is connected to the external connection terminal 40, a junction of the power supply electric line 13 which is connected to the external connection terminal 42, and a united junction of the power supply electric line 11 and the power supply electric line 14 which are connected to the external connection terminal 41 is so formed as to have smoothly and gently curved edges thereof.

In a variant of this embodiment, the power supply electric line 11 and the power supply electric line 14 located on an inner side of the four power supply electric lines are not united at the united position 47, but are independently connected to two external connection terminals disposed on the flexible wiring board 43, respectively. This variant can provide the same advantages. When the power supply electric line 11 and the power supply electric line 14 are thus connected to two external connection terminals disposed on the flexible wiring board 43, respectively, a capacitor 45 is inserted and connected between the power supply electric line 11 and the power supply electric line 12 at a very short distance from external connection terminals connected to the power supply electric lines 11 and 12, e.g., at a distance of 5 mm or less from locations where the external connection terminals are connected to the power supply electric lines 11 and 12, respectively, along the power supply electric lines 11 and 12, and another capacitor 46 is inserted and connected between the power supply electric line 13 and the power supply electric line 14 at a distance of 5 mm or less from locations where external connection terminals are connected to the power supply electric lines 13 and 14, respectively, along the power supply electric lines 13 and 14.

As mentioned above, in accordance with embodiment 4, since the first pair of power supply electric lines 11 and 12 and the second pair of power supply electric lines 13 and 14 are so arranged that the four power supply electric lines are in parallel with one another, and the two power supply electric lines 11 and 14 located on an inner side of the four power supply electric lines 11 to 14 are united to one line in the vicinity of the external connection terminal 41, and are then connected to the external connection terminal 41, the number of external connection terminals can be reduced by one as compared with above-mentioned embodiments 1 to 3 and a downsizing of the flexible wiring board 43 can be achieved. In addition, the reliability of electric wiring connection of the solid state image sensing device can be increased, and the manufacturing cost can be reduced.

The capacitor 45 is inserted between the first pair of power supply electric lines 11 and 12 at a very short distance of 5 mm or less from the united position 47 where the power supply electric line 11 and the power supply electric line 14 arranged inside in the four power supply electric lines 11 to 4 are unified and are connected to the external connection terminal 41, and the other capacitor 46 is inserted between the second pair of power supply electric lines 13 and 14, so that the power supply electric line 11 and the power supply electric line 12 are connected by the capacitor 45 and the power supply electric line 13 and the power supply electric line 14 are connected by the capacitor 46. Therefore, the intrinsic impedance of each of the power supply electric lines at the united position 47 can be reduced to a low level, and variations in the characteristic impedance of the circuitry during operation can be reduced.

The present embodiment offers another advantage of being able to bypass and remove high-frequency noise which invades the solid state image sensing device from outside the solid state image sensing device via each external connection terminal and high-frequency noise which enters the solid state image sensing device via each pair of power supply electric lines.

When the first pair of power supply electric lines 11 and 12 and the second pair of power supply electric lines 13 and 14 are so arranged that the four power supply electric lines are in parallel with one another and the four power supply electric lines 11 to 14 are connected to four external connection terminal independently disposed on the flexible wiring board 43, respectively, a capacitor is inserted and connected between the power supply electric lines included in each power supply electric line pair at a very short distance of the corresponding pair of external connection terminals. The intrinsic impedance of each of the power supply electric lines can be reduced to a low level and high-frequency noise which invades the solid state image sensing device from outside the solid state image sensing device via each external connection terminal and high-frequency noise which enters the solid state image sensing device via each pair of power supply electric lines can be bypassed and removed.

In addition, each of the first pair of power supply electric lines 11 and 12 and the second pair of power supply electric lines 13 and 14 which are formed on the flexible wiring board 43 has a bend portion that is so bent smoothly that the power supply electric lines included in each power supply electric line pair have a predetermined radius of curvature or less and are curved gently. Therefore, the change in the intrinsic impedance of each of the first and second pairs of power supply electric lines which occurs at the bend portion thereof can be reduced, and therefore reflection of signals and radiation of electromagnetic waves which occur at the bend portion and hence dynamic noises can be reduced, thereby improving the resistance to noise. The present embodiment thus offers a further advantage of being able to make the image pickup function of the solid state image sensing device work with stability.

Furthermore, the united junction 47 of the power supply electric line 11 and the power supply electric line 14 which are connected to the external connection terminal 41 is so formed as to have smoothly and gently curved edges each having a predetermined radius of curvature or less. Therefore, the change in the intrinsic impedance of each of the two power supply electric lines 11 and 14 which occurs at the united portion where they are united can be reduced, and therefore reflection of signals and radiation of electromagnetic waves which occur at the united portion and hence dynamic noises can be reduced, thereby improving the resistance to noise. The present embodiment thus offers a further advantage of being able to make the image pickup function of the solid state image sensing device work with stability.

Furthermore, each of the junction of the power supply electric line 12 which is connected to the external connection terminal 40 and the junction of the power supply electric line 13 which is connected to the external connection terminal 42 is so formed as to have smoothly and gently curved edges each having a predetermined radius of curvature or less. Therefore, the change in the intrinsic impedance of each of the power supply electric lines 12 and 13 which occurs at each of the junctions where the power supply electric line 12 or 13 and the corresponding external connection terminal are connected to each other can be reduced, and therefore reflection of signals and radiation of electromagnetic waves which occur at each of the junctions and hence dynamic noises can be reduced, thereby improving the resistance to noise. The present embodiment thus offers a further advantage of being able to make the image pickup function of the solid state image sensing device work with stability.

Embodiment 5

Next, a solid state image sensing device according to embodiment 5 of the present invention will be explained. The solid state image sensing device according to embodiment 5 of the present invention is a variant of the solid state image sensing device as shown in either of FIGS. 1 to 4.

(1) In the solid state image sensing device as shown in either of FIGS. 1 to 4, each of the solid state image sensor 1 and the integrated circuit chip 2 is connected to a power supply electric line pair in which a pair of a high-potential power supply electric line and a low-potential power supply electric line is arranged at a very short gap between them.

Most of general-purpose solid state image sensors and general-purpose integrated circuit chips which have various functions have a plurality of pairs of power supply pads. Therefore, each of the solid state image sensor and the integrated circuit chip included in the solid state image sensing device according to this embodiment can be categorized as one of the following types (a) to (c). Hereafter, the arrangement and so on of the power supply electric lines dependent upon each of the types will be explained.

(a) First type: an analog circuit and a digital circuit are disposed together.

In general, digital circuits have a large noise margin, whereas analog circuits have a small noise margin. In case where a CMOS device is used as the digital circuit of the solid state image sensor or the integrated circuit chip, since a passing through current occurs and power consumption increases when a signal has a value that cannot be assumed to have a logical value "1" or a logical value "0". Therefore, when the power supply electric lines are shared between the digital circuit and the analog circuit, a change in the power supply current which is caused by the digital circuit can have a deleterious effect on the operation of the analog circuit via the power supply electric lines and analog signals in the analog circuit can therefore degrade in quality. That is, the power supply for the analog circuit needs to be separated from that for the digital circuit, the power supply including the power supply electric lines.

However, there are some circuits in which the power supply for an analog circuit disposed therein cannot be separated from that for a digital circuit disposed therein. For example, such circuits include an analog to digital converter abbreviated as ADC, a digital to analog converter abbreviated as DAC, a DC-DC converter, a comparator, a booster circuit, i.e., a charge pump circuit, a memory reading circuit, a sample hold circuit, a pixel reading circuit, and a correlation double sampling circuit abbreviated to CDS. On the other hand, a digital circuit which does not always run can operate from a common power supply which is shared between the digital circuit and an analog circuit without any problems. When the power supply for the analog circuit is separated from that for the digital circuit, it is necessary to take the following requirements into consideration.

In either the solid state image sensor or the integrated circuit chip in which an analog circuit and a digital circuit are disposed together, a pair of power supply electric lines for mainly supplying electric power to the analog circuit is disposed independently of another pair of power supply electric lines for mainly supplying electric power to the digital circuit, each pair of power supply electric lines including a high-potential power supply electric line and a low-potential power supply electric line arranged at a very short gap between them, like the above-mentioned pairs of power supply electric lines formed on the flexible wiring board. In either the solid state image sensor or the integrated circuit chip, for each pair of power supply electric lines, a power supply pad for connecting with the positive-potential power supply electric line and another power supply pad for connecting with the negative-potential power supply electric line are arranged side by side. That is, power supply pads are arranged along one side of each of the solid state image sensor and the integrated circuit chip so that they are adjacent to each other.

Each pair of power supply electric lines is formed on the flexible wiring board so that the power supply electric lines have a width and a gap between them which are held almost constant throughout the length thereof, are extending in parallel with each other, and have a bend portion which is curved smoothly and gently with a predetermined curvature or less, as explained in embodiment 1. Each power supply electric line pair formed on the flexible wiring board is a combination of a high-potential power supply electric line and a low-potential power supply electric line. In case where two or more pairs of power supply electric lines are formed on the flexible wiring board, as mentioned above, the power supply electric lines included in each power supply electric line pair are so arranged that they are extending from the corresponding pair of power supply pads and are substantially in parallel with each other, and have a nearly constant width and a nearly constant gap between them throughout the length thereof. The two or more pairs of power supply electric lines can be formed on the printed wiring board, as mentioned above, like each pair of power supply electric lines formed on the printed wiring board as shown in either of FIGS. 1 to 4.

When the two or more pairs of power supply electric lines are thus formed on the printed wiring board, it is possible to prevent a current variation caused by a passing through current which occurs in the digital circuit, such as a CMOS switching circuit, which constitutes either the solid state image sensor or the integrated circuit chip, from causing fluctuation noise in the power supply voltage and then entering the analog circuit via the power supply circuit. As a result, there can be provided a high-performance solid state image sensing device with few dynamic noises, in which a fixed supply voltage having no harmful noise is supplied to the analog circuit, and therefore the analog circuit can operate with stability and can send out an analog output with few noises.

(b) Second type: two or more different supply voltages need to be provided.

Fundamentally, in either the solid state image sensor or the integrated circuit chip, for each power supply voltage, a power supply pad for connecting with a high-potential power supply electric line and another power supply pad for connecting with a low-potential power supply electric line are arranged side by side. That is, power supply pads are arranged along one side of either the solid state image sensor or the integrated circuit chip so that they are adjacent to one another.

Each pair of power supply electric lines is formed on the flexible wiring board so that the power supply electric lines have a width and a gap between them which are held almost constant throughout the length thereof, are extending in parallel with each other, and have a bend portion which is curved smoothly and gently with a predetermined curvature or less, as explained in embodiment 1. Each power supply electric line pair formed on the flexible wiring board is a combination of a high-potential power supply electric line and a low-potential power supply electric line. In case where two or more power supply voltages need to be provided, as mentioned above, each pair of power supply electric lines connected to a pair of power supply pads corresponding to a power supply voltage is so arranged that the power supply electric lines are substantially in parallel with each other, and have a nearly constant width and a nearly constant gap between them throughout the length thereof. The two or more pairs of power supply electric lines which are associated with the two or more different power supply voltages, respectively, can be formed on the printed wiring board, like either one of the two pairs of power supply electric lines formed on the printed wiring board as shown in either of FIGS. 1 to 4.

(c) Third type: either a circuit group which produces noises or a circuit group which is easy to be influenced by noises is included in either the solid state image sensor or the integrated circuit chip.

When circuit groups having different noise characteristics are thus disposed together in either the solid state image sensor or the integrated circuit chip, a pair of power supply electric lines is independently disposed in each of the circuit groups disposed in either the solid state image sensor or the integrated circuit chip, and a power supply pad for connecting with a high-potential power supply electric line and another power supply pad for connecting with a low-potential power supply electric line are arranged, as a pair, side by side for the pair of power supply electric lines independently disposed in each of the circuit groups. That is, power supply pads are arranged along one side of either the solid state image sensor or the integrated circuit chip so that they are adjacent to one another.

However, in a case where power supply pads are arranged along one side of either the solid state image sensor or the integrated circuit chip so that they are adjacent to one another, when each circuit group is placed in a dynamic operating state, a current flowing into a high-potential power supply supplied to each circuit group needs to have an amount equal to that of a current flowing into a low-potential power supply. This is because a differential current is made to flow via every pair of power supply pads provided for each circuit group.

Each pair of power supply electric lines is formed on the flexible wiring board so that the power supply electric lines have a width and a gap between them which are held almost constant throughout the length thereof, are extending in parallel with each other, and have a bend portion which is curved smoothly and gently with a predetermined curvature or less, as explained in embodiment 1. Each power supply electric line pair formed on the flexible wiring board is a combination of a high-potential power supply electric line and a low-potential power supply electric line. In case where two or more power supply voltages need to be provided, as mentioned above, each pair of power supply electric lines connected to a pair of power supply pads corresponding to a power supply voltage is so arranged that the power supply electric lines are substantially in parallel with each other, and have a nearly constant width and a nearly constant gap between them throughout the length thereof. The two or more pairs of power supply electric lines which are associated with the two or more different power supply voltages, respectively, can be formed on the printed wiring board, like either one of the two pairs of power supply electric lines formed on the printed wiring board as shown in either of FIGS. 1 to 4.

As can be seen from the above explanation, it is preferable to arrange each pair of power supply pads to the specifications of the solid state image sensor and the integrated circuit chip so that the corresponding pair of power supply electric lines can be easily formed on the flexible wiring board, and it is important to design the solid state image sensor and the integrated circuit chip so that EMC measures can be easily taken for the flexible wiring board.

By forming two or more pairs of power supply electric lines on the flexible wiring board depending upon either one of the above-mentioned types (a) to (c), each of these pairs of power supply electric lines can be made to work as a distributed constant circuit of the transmission line and can have a characteristic impedance which is held at a nearly-constant low value. Therefore, supply of a voltage and a current of electric power can be performed in the form of a differential signal and in-phase signals that are transmitted independently of each other.

(2) In the solid state image sensing device shown in FIG. 2, although the via holes 27 to 30 have a diameter which is so set as to be much the same as or smaller than the width of the power supply electric line 21 to 26 and each of the via holes has an intrinsic impedance which is so set as to get close to that of the flexible electric wiring as much as possible, it is actually difficult to bring the intrinsic impedance of each of the via holes close to that of the flexible electric wiring. As a result, each of the via holes varies in its intrinsic impedance, and therefore reflection noises and radiation of electromagnetic waves occur.

Figure 12:
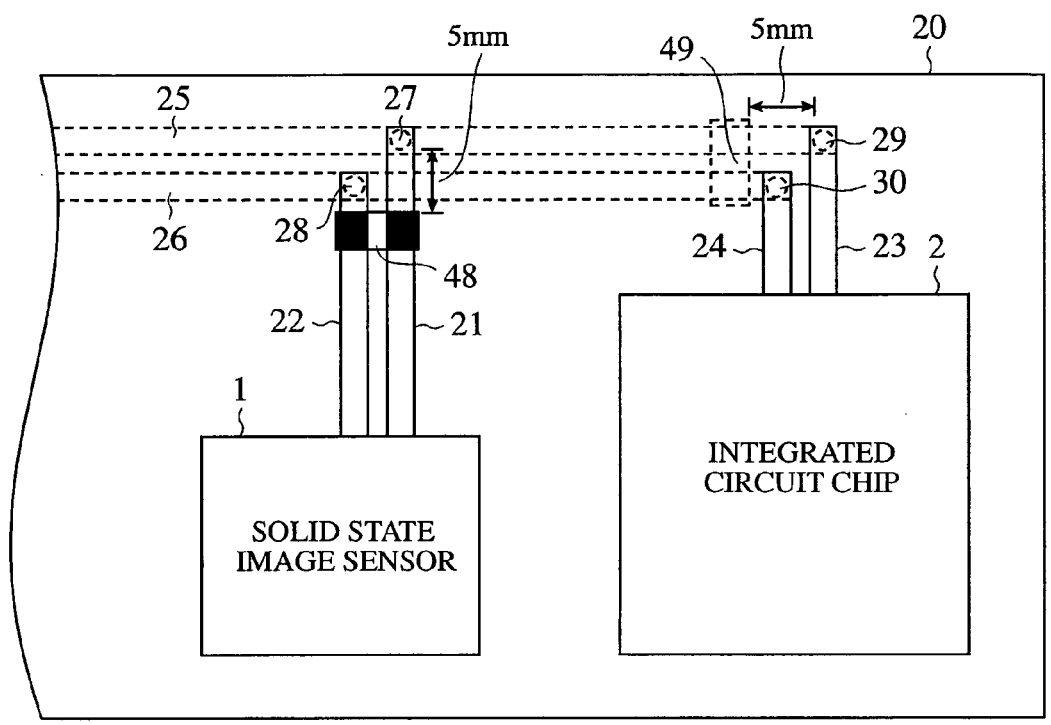
FIG. 12 is an explanatory drawing showing the structure of the solid state image sensing device according to embodiment 5.

To solve this problem, a capacitor 48 is inserted at a very short distance of 5 mm or less from the via holes 27 and 28 and is connected between the via holes 27 and 28, and another capacitor 49 is inserted at a very short distance of 5 mm or less from the via holes 29 and 30 and is connected between the via holes 29 and 30, as shown in FIG. 12. As a result, since reflection noises and radiation of electromagnetic waves can be bypassed and removed, the adverse effect on both the solid state image sensor 1 and the integrated circuit chip 2, and not-shown external connection terminals connected to the pairs of power supply electric lines 25 and 26 formed on the back surface of the flexible wiring board 20 can be eliminated.

Concretely, a capacitor is inserted at a very short distance from the via holes 27 and 28 and is connected between either or both of the pair of power supply electric lines 21 and 22 extending toward the solid state image sensor 1 and the pair of power supply electric lines 25 and 26 extending toward the not-shown external connection terminals, and another capacitor is inserted at a very short distance from the via holes 29 and 30 and is connected between either or both of the pair of power supply electric lines 23 and 24 extending toward the integrated circuit chip 2 and the pair of power supply electric lines 25 and 26 extending toward the not-shown external connection terminals.

Thus, by inserting a capacitor at a very short distance from each pair of via holes, the intrinsic impedances of junctions with corresponding power supply electric lines and the intrinsic impedances of the via holes can be reduced, and therefore variations in the corresponding supply voltage due to variations in the corresponding power supply current can be reduced. High-frequency noises which invade from outside the solid state image sensing device via the not-shown external connection terminals, and high-frequency noises which enter via the pairs of power supply electric lines can be bypassed and removed.

(3) Each of the flexible wiring boards 3, 33, and 43 on each of which printed wiring is formed on one side surface thereof, as shown in FIGS. 1, 3, and 4, and the flexible wiring board 20 on which printed wiring is formed on both side surfaces thereof, as shown in FIG. 2, can be so constructed as to serve as electric wiring to be connected to another printed wiring board which is not illustrated, as mentioned later. Since each of the flexible wiring boards 3, 20, 33, and 43 can be flexibly varied in shape, it can be installed in the solid state image sensing device while dimensional tolerances of an installation portion thereof can be absorbed by the installation. Since each of the flexible wiring boards can be folded, it is also possible to install it into a housing so that the solid state image sensor 1 and the integrated circuit chip 2 are laminated or piled up and a downsizing of the solid state image sensing device can be achieved, as mentioned later. Furthermore, since each of these flexible wiring boards 3, 20, 33, and 43 can be folded and secured to itself with an adhesive, the installation of the solid state image sensing device can be easily performed with stability while a further downsizing of the solid state image sensing device can be achieved.

(4) The set of external connection terminals 40 to 42 shown in FIG. 4 can be shaped in the form of a convex projection extending from one edge of the flexible wiring board 43. The external connection terminals shaped like convex projections have the following two variants. In a first variant, the convex projecting portion is formed by cutting out a side edge of the flexible wiring board so that it is projecting from the side edge of the flexible wiring board and has an end part which is projecting from the projecting portion in a horizontal direction of FIG. 4. An electrode pattern is then formed on the convex end part of the projecting portion. The electrode pattern is formed on one side surface of the projecting portion of the flexible wiring board so that it has a line and space of 0.5 mm and a plurality of strips each of which is shaped like a long and slender rectangle and has a length of 3 mm. Then, by applying a rust-proof gold coating to the plurality of strips which are thus formed, a plurality of electrodes are formed on the projecting portion of the flexible wiring board. A reinforcing plate is further stuck to the back surface of the end part of the projecting portion on which the electrode pattern is formed so that the end part has a strength which is sufficiently enough to be impervious to a plug connection with an external connector which is provided outside the solid state image sensing device. When the solid state image sensing device according to the present invention is attached and connected to an external device or the like, the projecting portion which is so constructed as mentioned above is inserted into such an external connector of the external device or the like. Typically, the solid state image sensing device is provided with external connection terminals which can be connected to the power supply electric lines which are extending 2 cm to 5 cm from the solid state image sensor 1 and the integrated circuit chip 2, which constitute the main body of the solid state image sensing device, and which can be attached to an external connector, as mentioned later.

In a second variant, a male or female connector is used as the external connection terminals. Typically, the solid state image sensing device can be provided with a connector which is disposed at ends of the power supply electric lines which are extending 2 cm to 5 cm from the main body of the solid state image sensing device in which the solid state image sensor 1, the integrated circuit chip 2, and so on are disposed, as mentioned later. The connector is attached to the flexible wiring board by means of soldering or the like. The connector is then engaged into the other party's connector which is disposed outside the solid state image sensing device according to the present invention, and is electrically connected to an external device or the like.

Thus, when the flexible wiring board is so constructed as to have the above-mentioned external connection terminals or the above-mentioned connector, which is disposed at ends of the power supply electric lines which are extending 2 cm to 5 cm from the main body of the solid state image sensing device in which the solid state image sensor 1, the integrated circuit chip 2, and so on are disposed, the flexible wiring board can serve as electric wiring to be connected with another printed circuit and therefore connection with another printed circuit can be easily established. In a case where two or more solid state image sensing devices are provided, cables for connecting among the two or more solid state image sensing devices can be simplified and therefore the component count can be reduced.

Figure 6:
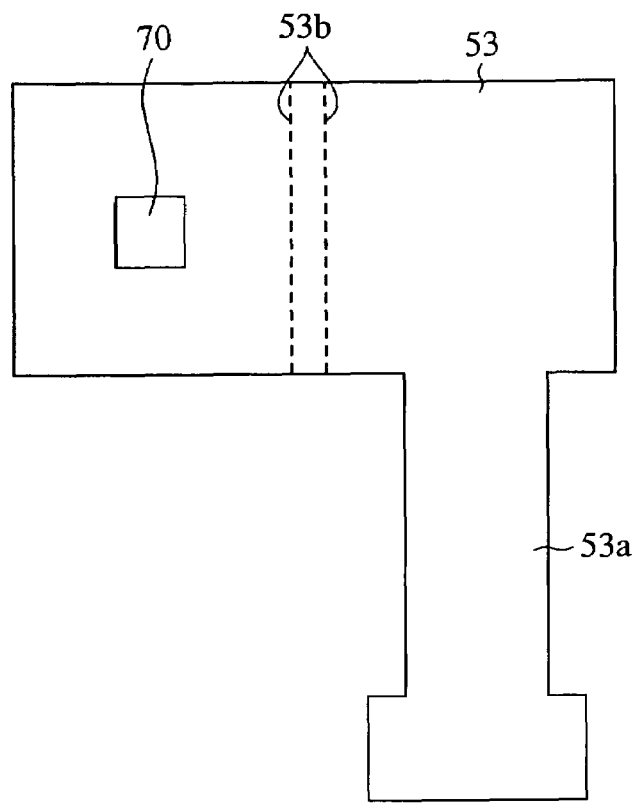
FIG. 6 is an explanatory drawing showing the back of the solid state image sensing device according to embodiment 6.

As shown in FIG. 6, the flexible wiring board can have an external connection terminal portion 68 which is so fabricated as to serve as electric wiring for connecting with another printed wiring board, and to have a lead electric wiring portion which is extending from the flexible wiring board and is equipped with a toroidal core enclosing the lead electric wiring portion, as mentioned later. In this variant, each pair of power supply electric lines can serve as a distributed constant circuit and therefore supply of electric power to each of the solid state image sensor 1 and the integrated circuit chip 2 can be performed in the form of a differential signal and in-phase signals that are transmitted independently of each other. Induction of electromagnetic waves including components of lower frequency can be eliminated and unnecessary radiation of electromagnetic waves can be reduced, and therefore a stable supply of electric power having no noise can be provided for each of the solid state image sensor 1 and the integrated circuit chip 2.

Although the above description is directed to the layout of the power supply electric lines which can have a very large influence on the performance of the solid state image sensor 1 and the integrated circuit chip 2, signal electric lines formed on the flexible wiring board can be so constructed as to serve as a distributed constant circuit, too. However, when each of all signal electric lines is laid out as a pair of signal electric lines, the number of signal electric lines formed on the flexible wiring board is twice as large as the original number and therefore the electric wiring area increases, and it is difficult to do miniaturization of the solid state image sensing device. It is therefore preferable to form a pair of signal electric lines at a part of the flexible wiring board where EMI or EMS troubles occur easily, and to make the pair of signal electric lines serve as a distributed constant circuit, as effective EMC measures. For example, the layout of a pair of signal electric lines which is so formed as mentioned above for a clock signal is an effective EMC measure.

As mentioned above, according to the embodiment 5, in each of the solid state image sensor and the integrated circuit chip, a pair of power supply electric lines for supplying electric power to an analog circuit and another pair of power supply electric lines for supplying electric power to a digital circuit are separately disposed, and a high-potential power supply pad and a low-potential power supply pad respectively connected to the power supply electric lines for supplying electric power to the analog circuit are arranged side by side and a high-potential power supply pad and a low-potential power supply pad respectively connected to the other power supply electric lines for supplying electric power to the digital circuit are arranged side by side. Therefore, a stable supply of a power supply voltage having no noise is provided for the analog circuit, and the analog circuit can send out an analog output with high precision. The present embodiment thus offers an advantage of being able to make the image pickup function of the solid state image sensing device work with stability.

In addition, a pair of power supply electric lines can be provided for every power supply voltage supplied to each of the solid state image sensor and the integrated circuit chip and a high-potential power supply pad and a low-potential power supply pad respectively connected to power supply electric lines for supplying electric power are arranged side by side for every power supply voltage. Therefore, electric power can be supplied to each circuit which constitutes the solid state image sensor or the integrated circuit chip for every supply voltage, and the adverse effect of other circuits which run from different supply voltages upon each circuit which constitutes the solid state image sensor or the integrated circuit chip can be eliminated. The present embodiment thus offers a further advantage of being able to make each circuit which constitutes the solid state image sensor or the integrated circuit chip run with stability and to make the image pickup function of the solid state image sensing device work with stability.

In addition, in each of the solid state image sensor and the integrated circuit chip, each circuit which constitutes the solid state image sensing device or the integrated circuit chip can be divided into a circuit group which produces noise and another circuit group which is easy to be influenced by noise, and a pair of power supply electric line for supplying electric power is provided for each of the two circuit groups and a high-potential power supply pad and a low-potential power supply pad respectively connected to the power supply electric lines for supplying electric power are arranged side by side for every power supply voltage. The present embodiment thus offers another advantage of being able to supply stable electric power having no noise to the circuit which is easy to be influenced by noise and to make the image pickup function of the solid state image sensing device work with stability.

Furthermore, in each of the solid state image sensor and the integrated circuit chip, each circuit which constitutes the solid state image sensor or the integrated circuit chip can be divided into circuit groups, and a pair of power supply electric line is provided for every circuit group. In this case, when each circuit group is placed in a dynamic operating state, a current flowing into a high-potential power supply supplied to each circuit group needs to have an amount equal to that of a current flowing into a low-potential power supply. As a result, a differential current flows through a pair of a high-potential power supply pad and a low-potential power supply pad connected to the pair of power supply electric lines provided for every circuit group. The present embodiment thus offers a further advantage of being able to supply stable electric power having no noise to each of the solid state image sensor and the integrated circuit chip and to make the image pickup function of the solid state image sensing device work with stability.

Embodiment 6

Figure 5:
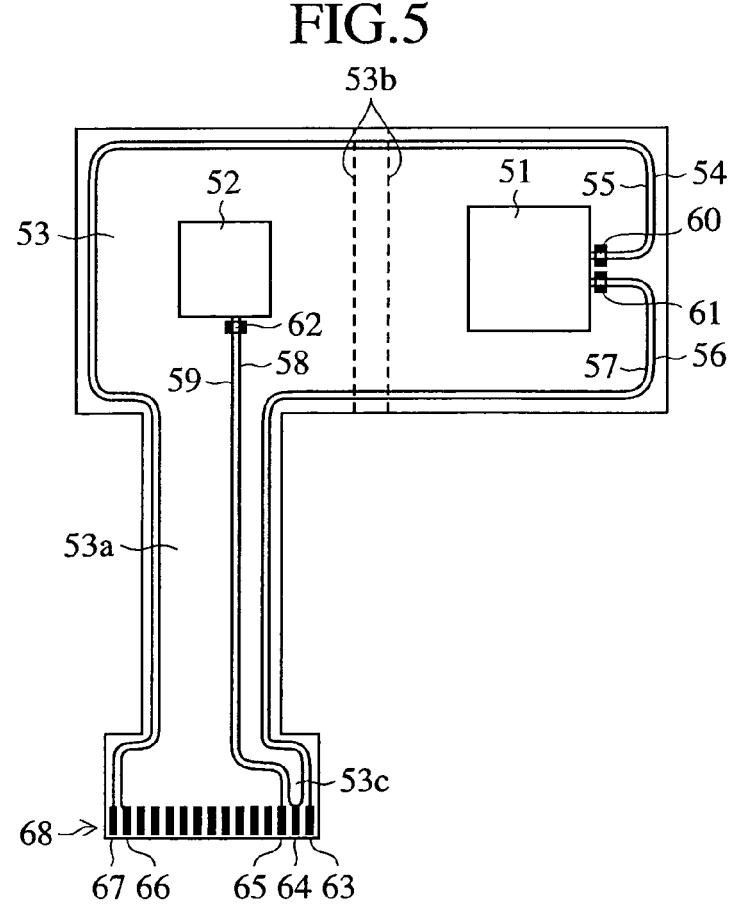
FIG. 5 is an explanatory drawing showing the structure of a solid state image sensing device in accordance with embodiment 6 of the present invention.

FIG. 5 is an explanatory drawing showing the structure of a solid state image sensing device in accordance with embodiment 6 of the present invention. FIG. 5 shows an outward appearance of power supply electric lines which are formed on a single-sided flexible printed wiring board. Illustrations of other signal electric lines and so on are omitted in the figure.

A solid state image sensor 51 and an integrated circuit chip 52, which constitute a main body of the solid state image sensing device, are mounted via flip-chip connections on a main portion of the single-sided flexible printed wiring board 53. Power supply electric lines 54 to 59 which are extending in parallel with and along an outer edge of the flexible printed wiring board 53 are formed in the main portion of the flexible wiring board 53, and those power supply electric lines are divided into three pairs of power supply electric lines and each pair of power supply electric lines is connected to a not-shown pair of two power supply pads via which electric power is supplied to either the solid state image sensor 51 or the integrated circuit chip 52, as mentioned later. Each pair of power supply pads are arranged along with one side of the solid state image sensor 51 or the integrated circuit chip 52 so that they are adjacent to each other, like those as shown in FIG. 1. Each of those pairs of power supply electric lines is formed on the flexible wiring board so that the power supply electric lines included in each power supply electric line pair have a width and a gap between them, which are similar to those as explained with reference to FIGS. 1 to 4, respectively, and which are held almost constant throughout the length thereof, and have some bend portions each of which is curved smoothly and gently with a predetermined curvature or less.

The flexible wiring board 53 is further provided with a lead electric wiring portion 53 on which all the pairs of power supply electric lines are extending from the main portion of the flexible wiring board 53, and an external connection terminal portion 68 projected from an end of the lead electric wiring portion 53a, on which external connection terminals for electrically connecting the solid state image sensing device to an external device.

For example, the first pair of power supply electric lines 54 and 55 connected to the solid state image sensor 51 is used for mainly supply electric power to an analog circuit included in the solid state image sensor 51, and the second pair of power supply electric lines 56 and 57 connected to the solid state image sensor 51 is used for mainly supply electric power to a digital circuit included in the solid state image sensor 51. The first pair of power supply electric lines 54 and 55 is arranged along an outer edge of the flexible wiring board 53 so that they are extending in a counterclockwise direction from their junctions with the solid state image sensor 51, whereas the second pair of power supply electric lines 54 and 55 is arranged along an outer edge of the flexible wiring board 53 so that they are extending in a clockwise direction (i.e., an opposite direction) from their junctions with the solid state image sensor 51. In the example shown in FIG. 5, a capacitor 60 is connected between the power supply electric line 54 and the power supply electric line 55 and at a distance of 3 mm or less from the junctions between two not-shown power supply pads for mainly supplying electric power to the analog circuit of the solid state image sensor 51 and the power supply electric lines 54 and 55, and another capacitor 61 is connected between the power supply electric line 56 and the power supply electric line 57 and at a distance of 3 mm or less from the junctions between two not-shown power supply pads for mainly supplying electric power to the digital circuit of the solid state image sensor 51 and the power supply electric lines 56 and 57.

The third pair of power supply electric lines 58 and 59 connected to a pair of two not-shown power supply pads via which electric power is supplied to the integrated circuit chip 52 is used mainly for supplying electric power to a digital circuit included in the integrated circuit chip 52. In the example shown in FIG. 5, another capacitor 62 is connected between the power supply electric line 58 and the power supply electric line 59 and at a distance of 3 mm or less from the junctions between the two not-shown power supply pads for mainly supplying electric power to the integrated circuit chip 52 and the power supply electric lines 58 and 50.

The second pair of power supply electric lines 56 and 57 used for power supply to digital circuits are extending on the lead electric wiring portion 53a toward the external connection terminal portion 68 while their width and gap are held almost constant throughout the length thereof, and the third pair of power supply electric lines 58 and 59 used for power supply to digital circuits are extending on the lead electric wiring portion 53a toward the external connection terminal portion 68 while their width and gap are held almost constant throughout the length thereof. The power supply electric line 56 which is located on an outer side of the four power supply electric lines 56 to 59 which are thus extending in a line is connected to the external connection terminal 63. The power supply electric line 59 which is located on another outer side of the four power supply electric lines 56 to 59 is connected to the external connection terminal 65. The power supply electric lines 57 and 58 which are arranged at an inner side of the four power supply electric lines 56 to 59 are united at a united position 53c in the vicinity of the external connection terminal 64, and are connected in common to the external connection terminal 64.

Like the two pairs of power supply electric line 56 to 59, the first pair of power supply electric lines 54 and 55 used for power supply to analog circuits is extending on the lead electric wiring portion 53a toward the external connection terminal portion 68 while their width and gap are held almost constant throughout the length thereof, and is connected with a pair of external connection terminals 66 and 67, respectively. In FIG. 5, the external connection terminals 63 to 67 which are disposed at an edge of the lead electric wiring portion 53a and all other external connection terminals which are not shown in the figure are illustrated as the external connection terminal portion 68.

Figure 13:
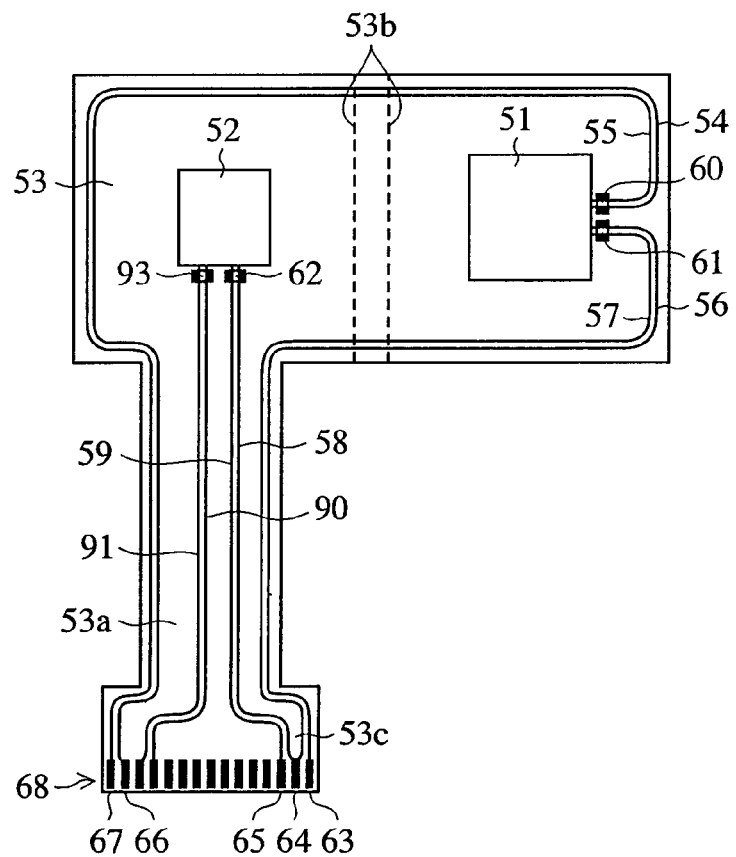
FIG. 13 is an explanatory drawing showing the structure of the solid state image sensing according to the embodiment 6.

Although the solid state image sensing device shown in FIG. 5 is not provided with any capacitor in the vicinity of the external connection terminals 63 to 67, a further capacitor can be connected between the power supply electric lines included in each power supply electric line pair and at a distance of 5 mm or less from the corresponding pair of external connection terminals. In this case, the effect of the EMC measures can be enhanced. In addition, when corresponding pairs of power supply electric lines which are so constructed as mentioned above are formed on a printed wiring board, such as a motherboard, which is the other party to which the external connection terminals 63 to 67 of the solid state image sensing device can be connected, and a capacitor is connected between the power supply electric lines included in each power supply electric line pair, the effect of the EMC measures can be further enhanced. It can be assumed that each of the three pair of external connection terminals 63 to 67 of the solid state image sensing device illustrated in FIG. 5 is connected to a corresponding pair of power supply electric lines between which a capacitor is connected, the corresponding pair of power supply electric lines being formed on a printed wiring board, such as a motherboard, which is the other party to which the solid state image sensing device can be connected. The integrated circuit chip 52 shown in FIG. 5 runs from a single power supply voltage of 2.8V (i.e., a difference between the potential of the power supply electric line 58 and that of the power supply electric line 59) which is supplied thereto via the power supply electric lines 58 and 59. In addition, when the integrated circuit chip 52 includes an analog circuit, a supply voltage for the analog circuit can be supplied from a further pair of power supply electric lines 90 and 91 additionally formed on the flexible wiring board 53 to the integrated circuit chip 52, as shown in an explanatory drawing of FIG. 13. Similarly, when the integrated circuit chip 52 includes a circuit which runs from a low supply voltage of 1.8V in order to reduce the power consumption of the integrated circuit chip 52, a supply voltage can be supplied, via the other pair of power supply electric lines 90 and 91, to the integrated circuit chip 52. A capacitor 93 can be connected between the power supply electric line 90 and the power supply electric line 91, like the capacitor 62.

FIG. 6 is an explanatory drawing showing the back surface of the solid state image sensing device according to embodiment 6. This figure shows a state in which the solid state image sensing device shown in FIG. 5 is turned over. The same components as shown in FIG. 5 are designated by the same reference numerals, and the explanation of the components will be omitted hereafter. The flexible wiring board 53 is folded two times in front along two dashed lines 53b shown in FIGS. 5 and 6 so that the side surface on which electric wiring including the power supply electric lines are formed is bowed inward, and so that the solid state image sensor 51 and the integrated circuit chip 52, which are mounted in the main portion of the flexible wiring board 53 and which constitute the main body of the solid state image sensing device, are laminated or piled up. The solid state image sensing device according to embodiment 6 is provided with the flexible wiring board 53 which is folded in this way. In other words, FIGS. 5 and 6 show "a development of the flexible wiring board 53 of the solid state image sensing device according to embodiment 6."

An opening 70 shown in FIG. 6 is a through hole which is so formed in the flexible wiring board 53 as to match with a light receiving unit of the solid state image sensor 51 mounted on the flexible wiring board 53. The opening 70 has a rectangular cross-sectional shape, for example. Therefore, as shown in FIG. 6, the solid state image sensor 51 is so arranged as to block the opening 70. In other words, the solid state image sensor 51 is so mounted that the light receiving unit for receiving light, i.e., an image sensing area of the solid state image sensor 51 can be seen through the opening 70.

Figure 7A:
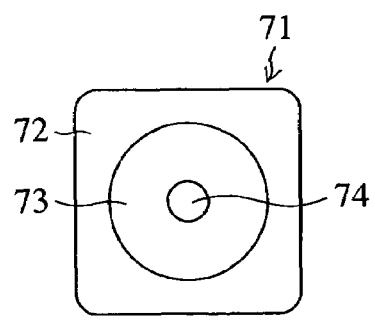
FIGS. 7A to 7C are explanatory drawings showing the structure of an optical unit of the solid state image sensing device according to embodiment 6.
Figure 7C:
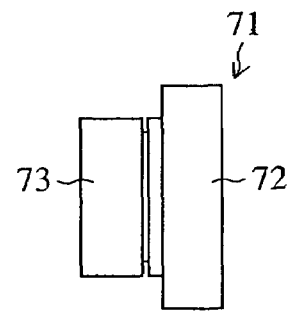
Figure 7B:
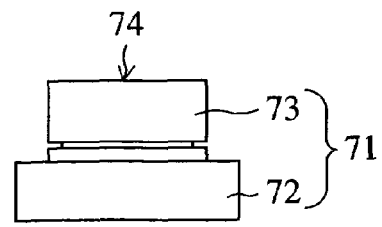

FIGS. 7A to 7C are explanatory drawings showing the structure of an optical unit of the solid state image sensing device according to embodiment 6. FIG. 7A shows a front view of the optical unit 71, FIG. 7B shows a bottom plan view of the optical unit 71, and FIG. 7C shows a side view of the optical unit 71. In other words, FIGS. 7A to 7C illustrate the optical unit 71 with trigonometry. The optical unit 71 has a fixed base 72 on which a fixed cap 73 is mounted, and the fixed cap 73 is provided with an aperture portion 74 formed on an upper surface thereof, for capturing light.

Figure 8:
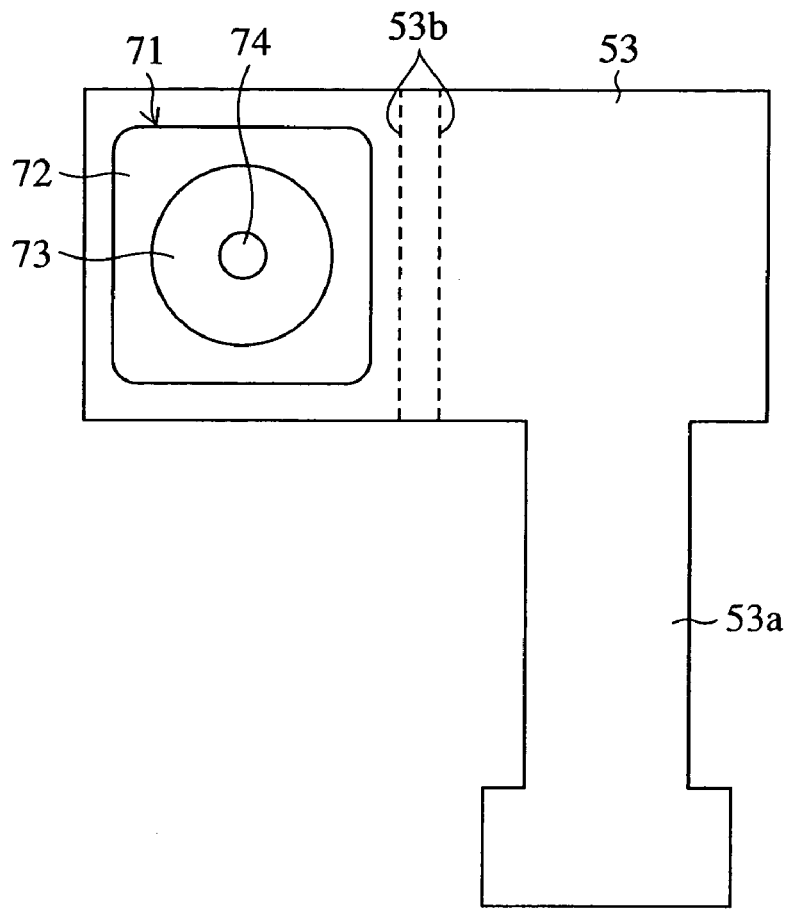
FIG. 8 is an explanatory drawing showing the solid state image sensing device according to embodiment 6 equipped with the optical unit.

FIG. 8 is an explanatory drawing showing the solid state image sensing device according to embodiment 6 equipped with the optical unit. FIG. 8 shows that the optical unit 71 is secured to the flexible wiring board 53 so as to be placed at a location corresponding to the location of the opening 70 formed in the flexible wiring board 53 shown in FIG. 6. In other words, FIG. 8 shows that the solid state image sensor 51, not shown, is mounted on the front surface of the flexible wiring board 53, while the optical unit 71 shown in FIGS. 7A to 7C is mounted on the back surface of the flexible wiring board 53. The optical unit 71 is arranged at the back surface of the flexible wiring board 53 so that light passing through the aperture portion 74 can be received by the light receiving unit of the solid state image sensor 51, and so that the aperture portion 74 matches with the opening 70, as mentioned later, and the fixed base 72 is secured to the flexible wiring board 53 with an adhesive or the like.

Figure 9:
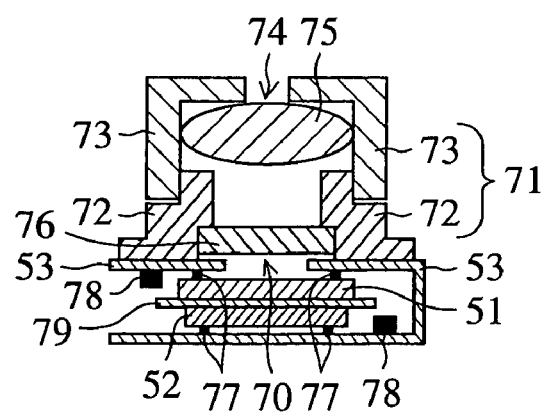
FIG. 9 is a longitudinal cross-sectional view showing the structure of the solid state image sensing device according to embodiment 6.

FIG. 9 is a longitudinal cross-sectional view showing the structure of the solid state image sensing device according to embodiment 6. FIG. 9 shows that the solid state image sensing device is formed by folding the flexible wiring board 53 as shown in FIG. 8 two times behind along the two dashed lines 53*b* so that the solid state image sensor 51 and the integrated circuit chip 52 are laminated or piled up, as mentioned above. The solid state image sensor 51 and the integrated circuit chip 52 which are flip-chip mounted on the front surface of the flexible wiring board 53 are thus piled up by folding the flexible wiring board 53, as shown in FIG. 9.

Since the flexible wiring board 53 can become deformed flexibly, it is not necessary to fold it along the two dashed lines 53*b* so that the flexible wiring board 53 has a square-cornered portion along each of the two dashed lines 53*b*, and therefore the flexible wiring board 53 is so folded that it has a gently-curved portion along each of the two dashed lines 53*b* and the solid state image sensor 51 and the integrated circuit chip 52 are piled up. When the flexible wiring board 53 is thus made to become deformed gently, a variation of the intrinsic impedance of each signal electric wiring which occurs at each of the dashed lines 53*b* can be reduced and a variation of the intrinsic impedance of each power supply electric line which occurs at each of the dashed lines 53*b* can be also reduced. As shown in FIG. 9, two or more components 78, such as a capacitor connected between the two power supply electric lines of each power supply electric pair, which is not illustrated, as well as the solid state image sensor 51 and the integrated circuit chip 52 illustrated in FIG. 9, are mounted on the surface of the flexible wiring board 53. Effective EMC measures can be taken by thus forming each pair of power supply electric lines in a plane so that they are adjacent to each other without using an expensive multilayer board, and the packing density of the solid state image sensing device can be increased by thus folding the single-sided flexible printed wiring board. While a problem with a multilayer wiring board is that electric lines formed in a certain layer causes a disconnection of electric lines disposed in another layer when the multilayer wiring board is folded because the electric lines sap the elasticity of the wiring board formed of a resin, the reliability of the single-sided printed wiring board according to this embodiment with respect to folding is improved. In other words, since the EMC measures of forming each pair of power supply electric lines in a plane so that they are adjacent to each other are taken, the low-cost high-reliability single-sided printed wiring board can be used for mounting the solid state image sensor 51 and the integrated circuit chip 52.

In FIG. 9, the solid state image sensor 51 mounted on the flexible wiring board 53 via two or more flip chip connections 77 is arranged above the integrated circuit chip 52 similarly mounted on the flexible wiring board 53 via two or more flip chip connections 77. The gap between the integrated circuit chip 52 and the solid state image sensor 51 which are made to vertically overlap each other is filled with a proper amount of adhesive 79 so that the solid state image sensor 51 and the integrated circuit chip 52 are secured to each other. As mentioned above, the solid state image sensor 51 is so arranged that the light receiving unit thereof matches with the opening 70 formed in the flexible wiring board 53.

On the back of the front surface on which the solid state image sensor 51 is mounted, i.e., the back surface of the flexible wiring board 53, the fixed base 72 is so secured that the aperture portion 74 matches with the opening 70, as mentioned above, and the optical unit 71 is mounted as shown in FIG. 9. The optical unit 71 is provided with an optical lens 75 for focusing image pickup light incident thereupon via the aperture portion 74, and an optical filter 76 which is so arranged as to cover the opening 70 of the flexible wiring board 53 at a lower part of the optical lens 75 shown in FIG. 9. The optical lens 75 is movably held by the fixed cap 73 such that a focal adjustment of the optical lens 75 can be performed. The optical filter 76 is locked by the fixed base 72 so that an upper part of the opening 70 of the flexible wiring board 53 is covered by the optical filter, as mentioned above. The optical filter 76 filters the image pickup light which has been focused by the optical lens 75 and is incident thereupon, and the filtered image pickup light is then sent out toward the opening 70.

FIG. 10 is an outline view of the solid state image sensing device according to embodiment 6. The same components as shown in FIGS. 5 to 9 are designated by the same reference numerals, and the explanation of those components will be omitted hereafter. The solid state image sensing device shown in FIG. 10 can be formed by folding the flexible wiring board 53 as shown in FIG. 8 two times behind along the two dashed lines 53*b*.

Next, the operation of the solid state image sensing device in accordance with embodiment of the present invention will be explained. While image pickup light from a photographic object is incident upon the solid state image sensor via the aperture portion 74, a positional relationship between the fixed base 72 and the fixed cap 73 is adjusted and the focal point of the optical lens 75 is adjusted. The focal adjustment is carried out so that the focal point of the optical lens 75 is positioned at the light receiving unit of the solid state image sensor 51, which the image pickup light reaches after passing through the optical filter 76. After the focal adjustment has been performed, a portion for movably holding the optical lens 75 is fixed with a semi-fixing adhesive or the like so that the location of the optical lens 75 is held constant. The image pickup light passing through the optical filter 76 is incident upon the light receiving unit which is the image pickup area of the solid state image sensor 51 via the opening 70 of the flexible wiring board 53 and an image is then formed on the image pickup area. The solid state image sensor 51 then converts the formed image information into a picked-up image signal by the solid state image sensor 51, and outputs this picked-up image signal to not-shown printed lines which are formed on the flexible wiring board 53. The picked-up image signal is inputted to the integrated circuit chip 52 via the printed lines formed on the flexible wiring board 53, and the integrated circuit chip 52 performs predetermined processing on the picked-up image signal and sends out the processed image signal onto printed lines extending on the lead electric wiring portion 53a of the flexible wiring board 53. The processed image signal outputted from the integrated circuit chip 52 reaches the external connection terminal portion 68 via the printed lines extending on the lead electric wiring portion 53a, and is outputted, as a picked-up image electric signal, to outside the solid state image sensing device via this external connection terminal portion 68.

In the solid state image sensing device which operates, as mentioned above, power is supplied to the solid state image sensor 51 and the integrated circuit chip 52 via the external connection terminals 63 to 67 and power supply electric lines 54 to 59 shown in FIG. 5, as mentioned above. As mentioned above, the power supply electric line 54 and the power supply electric line 55 connected to the solid state image sensor 51 are arranged in substantially parallel with each other, and the power supply electric line 56 and the power supply electric line 57 connected to the solid state image sensor 51 are arranged in substantially parallel with each other. Similarly, the power supply electric line 58 and the power supply electric line 59 connected to the integrated circuit chip 52 are arranged in substantially parallel with each other. In addition, the first pair of power supply electric lines 54 and 55 and the third pair of power supply electric lines 58 and 59 are so arranged that they have a gap which is twice or more as large as the gap between the power supply electric line 54 and the power supply electric line 55, like those explained in embodiment 1.

Furthermore, each of the second pair of power supply electric lines 56 and 57 and the third pair of power supply electric lines 58 and 59 has some bend portions and a united portion each of which is so bent smoothly that the power supply electric lines included in each power supply electric line pair have a predetermined radius of curvature or less and are curved gently, and the first pair of power supply electric lines 54 and 55 has some bend portions each of which is so bent smoothly that the power supply electric lines included in each power supply electric line pair have a predetermined radius of curvature or less and are curved gently. Each of the first through third pairs of power supply electric lines 54 and 55, 56 and 57, and 58 and 59 can be assumed to be a distributed constant circuit and can have a characteristic impedance which is held at a nearly-constant low value. Therefore, the supply of electric power to each of the solid state image sensor 51 and the integrated circuit chip 52 can be performed in the form of a differential signal and in-phase signals that are transmitted independently of each other. Therefore, a power supply voltage and a power supply current can be efficiently transmitted, as differential electric power components, to each of the solid state image sensor 51 and the integrated circuit chip 52.

When the first pair of power supply electric lines 54 and 55, the second pair of power supply electric lines 56 and 57, and the third pair of power supply electric lines 58 and 59 are so formed as mentioned above, while an electromagnetically induced voltage which is produces by either transmitted electric waves outputted from small communication equipment, such as a mobile phone, or high-frequency electric waves which originate from a digital circuit which is operating is uniformly applied, as in-phase components, to the two power supply electric lines included in each power supply electric line pair, no electromagnetically induced current flows through the two power supply electric lines included in each power supply electric line pair because it is prevented by high-impedance nodes. In other words, the first pair of power supply electric lines 54 and 55, the second pair of power supply electric lines 56 and 57, and the third pair of power supply electric lines 58 and 59 can eliminate electromagnetic inductions by the solid state image sensor 51 and the integrated circuit chip 52.

Since direct connection of signal lines and so on can be carried out between the solid state image sensor 51 and the integrated circuit chips 52 in the same plane, the lengths of those lines can be reduced. Therefore, electromagnetic waves emitted from those signal lines can be reduced and electromagnetic waves can be prevented from easily invading those signal lines from outside them and exerting an adverse effect on them.

FIG. 11 is an outline view showing the structure of a solid state image sensing device according to a variant of embodiment 6. The same components as shown in FIG. 10 are designated by the same reference numerals, and the explanation of those components will be omitted hereafter. The solid state image sensing device of FIG. 11 is equipped with a doughnut-shaped toroidal core 80 which is so placed as to enclose the lead electric wiring portion 53a of the flexible wiring board 53 of the solid state image sensing device shown in FIG. 10. When the doughnut-shaped toroidal core 80 is so arranged that the lead unit 53a penetrates the doughnut-shaped toroidal core 80, as previously explained in embodiment 5, each of the first through third pairs of power supply electric lines that are extending long on the main portion and the lead electric wiring portion 53a of the flexible wiring board 53 can serve as a distributed constant circuit and therefore supply of electric power to each of the solid state image sensor 51 and the integrated circuit chip 52 can be performed in the form of a differential signal and in-phase signals that are transmitted independently of each other. Induction of electromagnetic waves including components of lower frequency can be eliminated and unnecessary radiation of electromagnetic waves can be reduced, and therefore each of the solid state image sensor 51 and the integrated circuit chip 52 can be provided with a stable supply of electric power having no noise.

By changing the specifications of the optical lens 75 of the optical unit 71 shown in FIG. 9, the photography range and focal distance of the solid state image sensing device can be changed. For example, two or more miniaturized solid state image sensing devices according to this embodiment 6 having different photography ranges and focal distances can be incorporated into mobile phones or the like. In this case, the user of such a mobile phone can select and use one solid state image sensing device to take a close-in shot and a scenic shot. Furthermore, two or more solid state image sensing devices according to this embodiment 6 provided with optical lenses 75 which are oriented in different directions can be incorporated into mobile phones or the like. In this case, the user of such a mobile phone can change a shooting direction without changing the orientation of the mobile phone.

As mentioned above, according to the embodiment 6, each of the first pair of power supply electric lines 54 and 55, the second pair of power supply electric lines 56 and 57, and the third pair of power supply electric lines 58 and 59 is so arranged that the power supply electric lines included in each of these power supply electric line pairs has a very small gap therebetween, and the first pair of power supply electric lines 54 and 55 and the third pair of power supply electric lines 58 and 59 are so arranged that they have a gap which is twice or more as large as the gap between the power supply electric lines included in each of these power supply electric line pairs. Therefore, the intrinsic impedance of each pair of power supply electric lines can be sufficiently reduced and the coupling between the first pair of power supply electric lines 54 and 55 and the third pair of power supply electric lines 58 and 59 with respect to electric fields, magnetic fields, and electrostatic inductions can be sufficiently reduced. The present embodiment thus offers an advantage of being able to handle each pair of power supply electric lines electrically independently and hence to easily provide layout design of those pairs of power supply electric lines.

In addition, since each of the first pair of power supply electric lines 54 and 55, the second pair of power supply electric lines 56 and 57, and the third pair of power supply electric lines 58 and 59 has a wider width than those of other signal lines, the resistances of the power supply electric lines included in each power supply electric line pair can be reduced and therefore the operating frequency characteristics of a distributed constant circuit constructed of each of the first pair of power supply electric lines 54 and 55, the second pair of power supply electric lines 56 and 57, and the third pair of power supply electric lines 58 and 59 can be improved. The present embodiment thus offers another advantage of taking EMC measures for signals of higher frequencies.

Furthermore, each of the first pair of power supply electric lines 54 and 55, the second pair of power supply electric lines 56 and 57, and the third pair of power supply electric lines 58 and 59 has a bend portion that is so bent smoothly that the power supply electric lines included in each power supply electric line pair have a predetermined radius of curvature or less and are curved gently. Therefore, the change in the intrinsic impedance of each of the first through third pairs of power supply electric lines which occurs at the bend portion thereof can be reduced, and therefore reflection of signals and radiation of electromagnetic waves which occur at the bend portion and hence dynamic noises can be reduced, thereby improving the resistance to noise. The present embodiment thus offers a further advantage of being able to make the image pickup function of the solid state image sensing device work with stability.

In addition, the united junction 53c of the power supply electric line 57 and the power supply electric line 58 which are connected to the external connection terminal 64 is so formed as to have smoothly and gently curved edges each having a predetermined radius of curvature or less. Therefore, the change in the intrinsic impedance of each of the two power supply electric lines 57 and 58 which occurs at the united junction 53c where they are united can be reduced, and therefore reflection of signals and radiation of electromagnetic waves which occur at the united portion and hence dynamic noises can be reduced, thereby improving the resistance to noise. The present embodiment thus offers a further advantage of being able to make the image pickup function of the solid state image sensing device work with stability.

Furthermore, each of the junction of the power supply electric line 54 which is connected to the external connection terminal 67, the junction of the power supply electric line 55 which is connected to the external connection terminal 66, the junction of the power supply electric line 56 which is connected to the external connection terminal 63, the junction of the power supply electric line 57 which is connected to the external connection terminal 64, the junction of the power supply electric line 58 which is connected to the external connection terminal 64, and the junction of the power supply electric line 59 which is connected to the external connection terminal 65 is so formed as to have smoothly and gently curved edges each having a predetermined radius of curvature or less. Therefore, the change in the intrinsic impedance of each of the power supply electric lines which occurs at each of the junctions where the power supply electric line and the corresponding external connection terminal are connected to each other can be reduced, and therefore reflection of signals and radiation of electromagnetic waves which occur at each of the junctions and hence dynamic noises can be reduced, thereby improving the resistance to noise. The present embodiment thus offers a further advantage of being able to make the image pickup function of the solid state image sensing device work with stability.

In addition, each of the capacitors 60 to 62 are connected between the power supply electric lines included in the corresponding power supply electric line pair at a very short distance from the junction between the corresponding pair of power supply pads of the solid state image sensor 51 or the integrated circuit chip 52, and the corresponding power supply electric line pair. Therefore, the impedance of each of the power supply electric pads of the solid state image sensor 51 and the integrated circuit chip 52 can be reduced and high-frequency noise which occurs within the solid state image sensor 51 and the integrated circuit chip 52 and high-frequency noise which enters the solid state image sensing device via each pair of power supply electric lines can be bypassed and removed.

Furthermore, the flexible wiring board 53 is provided with the lead electric wiring portion 53a on which the first pair of power supply electric lines 54 and 55, the second pair of power supply electric lines 56 and 57, the third pair of power supply electric lines 58 and 59, and so on are extending from the main portion on which the solid state image sensor 51, the integrated circuit chip 52, etc. are mounted, and the external connection terminal portion 68 formed at an end of the lead electric wiring portion 53a. Therefore, the lead electric wiring portion 53a of the flexible wiring board 53 can serve as electric wiring to be connected with another printed circuit and therefore connection with another printed circuit can be easily established. In addition, cables for connecting with another printed circuit can be eliminated and therefore the component count can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid state image sensing device comprising:
    a wiring board including a first high-potential line and a first low-potential line which are arranged adjacently to each other in a plane and a second high-potential line and a second low-potential line which are arranged adjacently to each other in a plane;
    a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line; and an integrated circuit chip disposed on said wiring board, wherein each of said first high-potential line and said first low-potential line has a first portion, a second portion connected to said first portion via a first via hole, and arranged between said first via hole and said first or second power supply pad, and a third portion connected to said first portion via a second via hole, and arranged between said second via hole and said integrated circuit chip.

2. The solid state image sensing device according to claim 1, wherein said device further comprises a first capacitor which is located at a distance of 5 mm or less from said first via hole, and is connected between said first high-potential line and said first low-potential line, and a second capacitor which is located at a distance of 5 mm or less from said second via hole, and is connected between said first high-potential line and said first low-potential line.

3. A solid state image sensing device comprising:

a wiring board including a first high-potential line and a first low-potential line which are arranged adjacently to each other in a plane and a second high-potential line and a second low-potential line which are arranged adjacently to each other in a plane;

a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line;

a third high-potential line and a third low-potential line which are arranged adjacently to each other;

a first external connection terminal to which one of said first high-potential line and said first low-potential line is connected;

a second external connection terminal to which one of said third high-potential line and said third low-potential line is connected; and a third external connection terminal to which the other one of said first high-potential line and said first low-potential line and the other one of said third high-potential line and said third low-potential line are connected in common.

4. The solid state image sensing device according to claim 3, further comprising:

a first capacitor which is connected between said first high-potential line and said first low-potential line and is located at a distance of 5 mm or less from a junction between the other one of said first high-potential line and said first low-potential line and the other one of said second high-potential line and said second low-potential line, and a second capacitor which is connected between said third high-potential line and said third low-potential line and is located at a distance of 5 mm or less from said junction.

5. A solid state image sensing device comprising:

a wiring board including a first high-potential line and a first low-potential line which are arranged adjacently to each other in a plane and a second high-potential line and a second low-potential line which are arranged adjacently to each other in a plane;

a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line; and a capacitor which is disposed on said wiring board, is located at a distance of 3 mm or less from said first and second power supply pads, and is inserted and connected between said first high-potential line and said first low-potential line.

6. A solid state image sensing device comprising:

a wiring board including a first high-potential line and a first low-potential line which are arranged adjacently to each other in a plane and a second high-potential line and a second low-potential line which are arranged adjacently to each other in a plane; and a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line, wherein said wiring board further includes first and second external connection terminals to which said first high-potential line and said first low-potential line are connected, respectively, and said device further comprises a capacitor which is connected between said first high-potential line and said first low-potential line and is located at a distance of 5 mm or less from said first and second external connection terminals.

7. A solid state image sensing device comprising:

a wiring board including a first high-potential line and a first low-potential line which are arranged adjacently to each other in a plane and a second high-potential line and a second low-potential line which are arranged adjacently to each other in a plane; and a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line, wherein said wiring board includes a main portion on which said solid state image sensor is disposed and a lead electric wiring portion on which said first high-potential line and said first low-potential line are extending from said main portion toward external connection terminals, and said device further comprises a donut-shaped toroidal core via which said lead electric wiring portion is passed through.

8. A solid state image sensing device comprising:
a wiring board including a first high-potential line and a first low-potential line which are arranged adjacently to each other in a plane and a second high-potential line and a second low-potential line which are arranged adjacently to each other in a plane; and
a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line, wherein
a plurality of electric lines including said first high-potential line, said first low-potential line, second high-potential line, and said second low-potential line are arranged on only a side surface of said wiring board and said wiring board is so folded that the side surface thereof is bowed inward.

9. A solid state image sensing device comprising:
a wiring board including a first high-potential line and a first low-potential line which are arranged adjacently to each other in a plane and a second high-potential line and a second low-potential line which are arranged adjacently to each other in a plane;
a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line; and
an integrated circuit chip processing a signal from said solid state image sensor, wherein
said wiring board includes a third high-potential line and a third low-potential line which are arranged adjacently to each other in a plane, said integrated circuit chip having fifth and sixth power supply pads which are connected to said third high-potential line and said third low-potential line, respectively, and running from a supply voltage supplied thereto via said third high-potential line and said third low-potential line,
each of said third high-potential line and said third low-potential line has a first portion, a second portion connected to said first portion via a first via hole, and arranged between said first via hole and said fifth or sixth power supply pads, and a third portion connected to said first portion via a second via hole, and arranged between said second via hole and said solid state image sensor.

10. A solid state image sensing device comprising:
a wiring board including a first high-potential line and a first low-potential line which are arranged adjacently to each other in a plane and a second high-potential line and a second low-potential line which are arranged adjacently to each other in a plane; and
a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line, wherein
a gap between said first high-potential line and said first low-potential line is set to 0.1 mm or less.

11. A solid state image sensing device comprising:
a wiring board including a first high-potential line and a first low-potential line which are arranged adjacently to each other in a plane and a second high-potential line and a second low-potential line which are arranged adjacently to each other in a plane; and
a solid state image sensor including first and second power supply pads which are connected to said first high-potential line and said first low-potential line, respectively, and running from a power supply voltage applied thereto via said first high-potential line and said first low-potential line, said solid state image sensor further including third and fourth power supply pads which are connected to said second high-potential line and said second low-potential line, respectively, and running from a power supply voltage applied thereto via said second high-potential line and said second low-potential line, wherein
said solid state image sensor further includes an analog circuit for receiving the power supply voltage from said first and second power supply pads, and a digital circuit for receiving the supply voltage from said third and fourth power supply pads, and
said wiring board further includes signal lines having widths each less than those of said first high-potential line and said low-potential line.

12. A solid state image sensing device comprising:
a wiring board including a first pair of lines, said first pair of lines including a first high-potential line and a first low-potential line, and first and second power supply portions connected to the first high-potential line and the first low-potential line, respectively, and adapted to receive a first power voltage to be supplied to the first high-potential and low-potential lines from outside of the wiring board; and
a solid state image sensor including first and second power supply pads connected to the first high-potential line and the first low-potential line, respectively, and running from the first power voltage supplied by via the first high-potential and low-potential lines, wherein
no electrical line connected to the solid state image sensor other than the first and second power supply pads is arranged between an electrical path from the first power supply portion to the first power supply pad via the first high-potential line and an electrical path from the second power supply portion to the second power supply pad via the first low-potential line, and
the wiring board further includes signal lines connected to the solid state image sensor and having widths each less than the those of the first high-potential and low-potential lines.

13. A solid state image sensing device comprising:
a wiring board including a first pair of lines, said first pair of lines including a first high-potential line and a first low-potential line, and first and second power supply portions connected to the first high-potential line and the first low-potential line, respectively, and adapted to receive a first power voltage to be supplied to the first high-potential and low-potential lines from outside of the wiring board;
a solid state image sensor including first and second power supply pads connected to the first high-potential line and the first low-potential line, respectively, and running from the first power voltage supplied by via the first high-potential and low-potential lines; and
a capacitor which is disposed on the wiring board, is located at a distance of 3 mm or less from the first and second power supply pads, and is disposed and connected between the first high-potential and low-potential lines, wherein
no electrical line connected to the solid state image sensor other than the first and second power supply pads is arranged between an electrical path from the first power supply portion to the first power supply pad via the first high-potential line and an electrical path from the second power supply portion to the second power supply pad via the first low-potential line.

* * * * *